(12) United States Patent
Sato et al.

(10) Patent No.: US 6,812,421 B2
(45) Date of Patent: Nov. 2, 2004

(54) KEY SWITCH DEVICE, KEYBOARD WITH THE KEY SWITCH DEVICE, AND ELECTRONIC DEVICE WITH THE KEYBOARD

(75) Inventors: Hirofumi Sato, Gifu (JP); Isao Mochizuki, Gifu-ken (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 10/363,041

(22) PCT Filed: Sep. 4, 2001

(86) PCT No.: PCT/JP01/07665

§ 371 (c)(1),
(2), (4) Date: Feb. 28, 2003

(87) PCT Pub. No.: WO02/21553

PCT Pub. Date: Mar. 14, 2002

(65) Prior Publication Data

US 2003/0168328 A1 Sep. 11, 2003

(30) Foreign Application Priority Data

Sep. 5, 2000 (JP) ........................................ 2000-268669

(51) Int. Cl.[7] .............................................. H01H 13/70
(52) U.S. Cl. ...................................................... 200/344
(58) Field of Search ................................ 200/5 A, 517, 200/344, 345; 400/490, 491, 491.2, 495, 495.1, 496

(56) References Cited

U.S. PATENT DOCUMENTS

| | | | |
|---|---|---|---|
| 6,586,695 B2 * | 7/2003 | Sato et al. ................... | 200/344 |
| 2001/0027914 A1 | 10/2001 | Hsu ........................... | 200/344 |

FOREIGN PATENT DOCUMENTS

| | | | |
|---|---|---|---|
| DE | 196 01 492 A1 | 2/1997 | .......... H01H/13/20 |
| EP | 0 887 818 A2 | 12/1998 | .......... H01H/3/12 |
| EP | 0 966 010 A2 | 12/1999 | .......... H01H/3/12 |
| JP | A 5-342946 | 12/1993 | .......... H01H/13/20 |
| JP | A 10-172380 | 6/1998 | .......... H01H/13/14 |
| JP | A 11-3628 | 1/1999 | .......... H01H/13/14 |
| JP | A 2000-299032 | 10/2000 | .......... H01H/13/14 |
| JP | A 2000-315434 | 11/2000 | .......... H01H/13/14 |

* cited by examiner

Primary Examiner—Michael A. Friedhofer
(74) Attorney, Agent, or Firm—Oliff & Berridge, PLC

(57) ABSTRACT

A key switch device, wherein the second cam part (24B) of a second link member (4) is supported on a cantilever member (32) extended from the second link member (4) in the form of a cantilever and the cantilever member (32) is energized by a torsion spring (33) in the direction to allow the first cam part (24A) of a first link member (3) to abut mutually on the second cam part (24B), a cam face (25A) is formed on the second cam part (23B), a cam face (25A) abutting on the linear and punctate contact parts of the cam face (25A) of the second cam part (24B) at an acute angle in plan view and having a slanted surface (60) is formed on the first cam part (24A), and a clearance (63) formed from the contact part to the fixed point (64) of the torsion spring (33) is provided between the cam face (25A) of the second cam part (24B) and the slanted surface (60).

19 Claims, 11 Drawing Sheets

KEY SWITCH DEVICE, KEYBOARD WITH THE KEY SWITCH DEVICE, AND ELECTRONIC DEVICE WITH THE KEYBOARD

TECHNICAL FIELD

The present invention relates to a key switch device which performs a switching action while guiding a vertical movement of a key top by means of a pair of link members, a keyboard provided with the key switch device, and an electronic device provided with the keyboard. More particularly, the present invention relates to a key switch device which does not need a rubber spring generally used in a conventional key switch device and a complicated key top urging mechanism, and which can realize a key operation with a fine click touch in operating a key top and freely design the click touch, so that a constant depression characteristic of the key top can be maintained over a long term and furthermore the cost of the whole key switch device can be reduced, and a keyboard provided with the key switch device and an electronic device provided with the keyboard.

BACKGROUND ART

In association with the reduction in size, thickness, and others of a notebook-size personal computer which is one of electronic devices instruments, conventionally, there have been proposed various types of key switch devices to be used for a keyboard provided in the computer. This type of key switch device generally uses a rubber spring which urges a key top upward to hold the key top in a non-pressed position, whereas the rubber spring buckles with a click when the key top is pressed down, then performing a switching operation, and returns the key top to the non-pressed position after the switching operation.

The rubber spring is usually made of silicone rubber, EPDM rubber, etc., which is in general high in cost and the work of properly mounting the rubber spring while positioning in place in the key switch device. In the case where the rubber spring is used, the switching characteristic of the key switch device largely depend on the property of the rubber spring. It would therefore become difficult to freely change the switching characteristic of the key switch device.

In view of the above circumstances, many proposals to realize a key switch device without use of a rubber spring have been presented. For instance, Japanese patent unexamined publication No. 10-172380 discloses a key switch device in which a pair of first and second links are movably arranged between a hook of a key top and a hook of a base mold to guide the key top in a vertical direction, and a rubber sheet is stretched over between joint portions of the links.

In this key switch device, a circular projection formed on the underside of the key top is in close contact with the rubber sheet at the time of non-depression to hold the key top in a non-pressed state. When the key top is depressed, the key top presses the rubber sheet downward through the circular projection with increasing a tension of the rubber sheet so that the rubber sheet projects downward through a through hole, thereby switching, with a click, a switching area of a membrane sheet supported on a bottom plate. It is to be noted that, upon cancellation of the depression of the key top, the key top is moved upward by an elastic force of the rubber sheet to the original, non-pressed position.

The key switch device disclosed in the above-mentioned Japanese patent unexamined publication No. 10-172380, using no rubber spring, is not influenced by the size of a rubber spring and therefore can achieve an increase in designing freeness of the key switch device.

Although the above key switch device does not use a generally used rubber spring, however, the rubber sheet simply substitutes for the rubber spring and the rubber sheet is essential for the structure of the key switch device. It is therefore still insufficient in cost reduction of the whole key switch device. Furthermore, there is a problem that the work of stretching the rubber sheet over between the joints of the pair of links would complicate the work of assembling the key switch device. The key switch device also could perform a switching operation with a click touch when the key top is depressed; however, it is very difficult to freely design this click touch.

Furthermore, there has conventionally been proposed another key switch device configured so as to urge a key top upward through an elastic resinous member instead of the rubber spring and the rubber sheet. This elastic resinous member can be formed integrally with a resinous member constituting the key switch device and therefore it is effective in cost. If the key switch device is used for a long term, however, the elastic member may wear and a creep phenomenon may occur due to the stress repeatedly exerted on the elastic member, resulting in plastic deformation. When the elastic member wears and the plastic deformation occurs in the elastic member, the depression characteristic of the key top would be changed, deteriorating the key operability. When the wear and plastic deformation of the elastic member further advance, the elastic member could not elastically support any longer the vertical movement of the key top and, in some cases, the key switch device could not operate due to breakage or the like of the elastic member.

The present invention has been made to overcome the above problems and has an object to provide a key top device which can realize a key operation with a fine click touch during operation of a key top without needing a rubber spring generally used in a key switch device and a complicated key top urging mechanism, allow free design of the click touch, hold a constant depression characteristic of the key top over a long term, and achieve reduction in cost of the whole key switch device, and a key board provided with the key switch device and an electronic device provided with the keyboard.

DISCLOSURE OF INVENTION (1) To achieve the purpose, the key switch device according to the first invention is a key switch device including a key top and a pair of a first and a second link members movably disposed under the key top, for performing switching of a switching section while guiding a vertical movement of the key top by the first and second link members, characterized by including: a first cam portion formed in the first link member; a second cam portion formed in the second link member and disposed facing the first cam portion; a cantilever member formed in a cantilever beam shape extending from the first link member or the second link member to support at least one of the first cam portion and the second cam portion; and an urging member for elastically urging the cantilever member in which one of the cam portions is formed in a direction to bring the first cam portion and the second cam portion into contact with each other.

The key switch device according to the first invention is characterized in that the first or second link member formed with the cantilever member is provided with a placing part for placing the urging member.

Furthermore, the key switch device according to the first invention is characterized in that the urging member is constructed of a torsion spring including a first arm which comes into contact with the cantilever member and a second arm facing the first arm, the placing part includes a first holding part for holding the first arm and a second holding part for holding the second arm.

The key switch device according to the first invention is characterized in that the first holding part movably holds the first arm and the second holding part fixedly holds the second arm.

In the key switch device according to the first invention having the above structure, one of the first cam portion of the first link member and the second cam portion of the second link member is supported by the cantilever member extending like a cantilever beam from the first or second link member and the urging member urges the cantilever member in the direction to bring the first and second cam portions into contact with each other. By the contact state of the first cam portion of the first link member and the second cam portion of the second link member and the cooperative operation of the urging member which urges the cantilever member, the key top is urged upward and held in the non-depressed position and the key top can be returned to the non-depressed position upon cancellation of depression. Accordingly, the key switch device can be constructed without use of a rubber spring and a complicated urging mechanism, thus achieving a cost reduction. The urging member urges the cantilever member, so that the first and second cam portions are constantly held in contact with each other with the contact position varying in response to the vertical movement of the key top. By changing the shapes of the first and second cam portions as needed, therefore, it is possible to freely design the click touch which occurs during the key operation.

Furthermore, the cantilever member is elastically urged by the urging member so that one of the first and second cam portions supported on the cantilever member is held in contact with the other cam portion. The elastic force to bring the first and second cam portions into contact with each other may be produced by the urging member. Accordingly, the cantilever member is not requested to have the elastic force. Thus, the cantilever member can be made of a resinous material at low cost and to be relatively flexible. Consequently, there is little possibility that creep occurs in the cantilever member even when the switching operation is performed for a long term, and the switching operation can be ensured stably over a long term.

Furthermore, the placing part for placing the urging member is provided in the first or second link member, so that the urging member can integrally be mounted in the first or second link member, thus achieving a size reduction of the whole key switch device.

The torsion spring having the first and second arm portions is used as the urging member and the first and second arm portions are held respectively by the first and second holding parts of the placing part to hold the first and second arm portions which provide the urging force to each other in the torsion spring. This simple structure makes it possible to efficiently transmit the urging force produced between the arm portions to the cantilever member.

Moreover, the first arm portion is movably held in the first holding part and the second arm portion fixedly held in the second holding part, so that the urging force generated by the torsion spring is transmitted from the first arm portion being in contact with the cantilever member to the cantilever member. At this time, the first arm portion being movably held in the first holding part, during depression of the key top, the first arm portion is allowed to flexibly move in the first holding part in response to reactive force resulting from the contact force occurring between the first and second cam portions, while constantly holding the first and second cam portions in a contact relation.

(2) The key switch device according to the second invention is a key switch device including a key top and a pair of a first and a second link members movably disposed under the key top, for performing switching of a switching section while guiding a vertical movement of the key top by the first and second link members, characterized by including: a first cam portion formed in the first link member; a second cam portion formed in the second link member and disposed facing the first cam portion; a first cantilever member formed in a cantilever beam shape extending from the first link member to support the first cam portion; a second cantilever member formed in a cantilever beam shape extending from the second link member to support the second cam portion; a first urging member for elastically urging the first cantilever member in a direction to bring the first cam portion and the second cam portion into contact with each other; and a second urging member for elastically urging the second cantilever member in a direction to bring the first cam portion and the second cam portion into contact with each other.

The key switch device according to the second invention is characterized in that the first and second link members are provided with placing parts for placing the urging members respectively.

The key switch device according to the second invention is characterized in that the urging member is constructed of a torsion spring including a first arm which comes into contact with the cantilever member and a second arm facing the first arm, the placing part includes a first holding part for holding the first arm and a second holding part for holding the second arm.

The key switch device according to the second invention is characterized in that the first holding part movably holds the first arm and the second holding part fixedly holds the second arm.

In the key switch device according to the second invention, the first cantilever member supporting the first cam portion of the first link member is urged by the first urging member and the second cantilever member supporting the second cam portion of the second link member is urged by the second urging member, respectively, in a direction to bring the first and second cam portions into contact with each other. Accordingly, by the contact state of the first and second cam portions and the cooperative operation of the first and second urging members which urge the first and second cantilever members respectively, the key top is urged upward and held in the non-depressed position and the key top can be returned to the non-depressed position upon cancellation of depression. Accordingly, the key switch device can be constructed without use of a rubber spring and a complicated urging mechanism, thus achieving a cost reduction. The first and second urging members urge the first and second cantilever members, so that the first and second cam portions are constantly held in contact with each other with the contact position varying in response to the vertical movement of the key top. By changing the shapes of the first and second cam portions as needed, therefore, it is possible to freely design the click touch which occurs during the key operation.

Furthermore, the first and second cantilever members are elastically urged by the first and second urging members respectively so that the first and second cam portions supported on the cantilever members are brought into contact with each other. The elastic force to bring the first and second cam portions into contact with each other may be produced by the first and second urging members. Accordingly, the first and second cantilever members are not requested to have the elastic force. Thus, each cantilever member can be made of a resinous material at low cost and to be relatively flexible. Consequently, there is little possibility that creep occurs in each cantilever member even when the switching operation is performed for a long term, and the switching operation can be ensured stably over a long term.

Furthermore, the placing parts for placing the urging members are provided in the first and second link members, so that the urging members can integrally be mounted in the first and second link members, thus achieving a size reduction of the whole key switch device.

The simple structure that the torsion spring having the first and second arm portions is used as the urging member, the first and second arm portions are held respectively by the first and second holding parts of the placing part to hold the first and second arm portions which provide the urging force to each other in the torsion spring. Accordingly, the urging force produced between the arm portions can be transmitted efficiently to the cantilever member.

Moreover, the first arm portion is movably held in the first holding part and the second arm portion fixedly held in the second holding part, so that the urging force generated by the torsion spring is transmitted to the cantilever member from the first arm portion being in contact with the cantilever member. At this time, the first arm portion being movably held in the first holding part, during depression of the key top, the first arm portion flexibly moves in the first holding part in response to reactive force resulting from the contact force occurring between the first and second cam portions, while constantly holding the first and second cam portions in a contact relation.

(3) The key switch device according to the third invention is a key switch device including a key top and a pair of a first and a second link members movably disposed under the key top, for performing switching of a switching section while guiding a vertical movement of the key top by the first and second link members, characterized by including: a first cam portion formed in the first link member; a second cam portion formed in the second link member and disposed facing the first cam portion; a cantilever member formed in a cantilever beam shape extending from the first link member or the second link member to support at least one of the first cam portion and the second cam portion; and an urging member for elastically urging the cantilever member in which one of the cam portions is formed in a direction to bring the first cam portion and the second cam portion into contact with each other, wherein the first cam portion and the second cam portion are brought into contact with each other at contact portions, the first cam portion and the second cam portion each have a shape to cause the point of action of the urging force of the urging member acting on the contact portions to shift to a predetermined fixed point side of the urging member in association with a repeated switching operation.

The key switch device according to the third invention is characterized in that the first or second link member formed with the cantilever member is provided with a placing part for placing the urging member.

The key switch device according to the third invention is characterized in that the urging member is constructed of a torsion spring including a first arm which comes into contact with the cantilever member and a second arm facing the first arm, the placing part includes a first holding part for holding the first arm and a second holding part for holding the second arm.

The key switch device according to the third invention is characterized in that the first holding part movably holds the first arm and the second holding part fixedly holds the second arm.

The key switch device according to the third invention is characterized in that one of the cam portions supported by the cantilever member is formed with a first cam surface parallel to the first arm, the other cam portion of the first cam portion and the second cam portion is formed with a second cam surface which is brought into contact with the first cam surface in the contact portions at an acute angle in plan view and has a slanted surface, and a clearance is provided between the first cam surface and the slanted surface to open from the contact portions toward the fixed point side of the urging member.

In the key switch device according to the third invention, one of the first cam portion of the first link member and the second cam portion of the second link member is supported by the cantilever member extending like a cantilever beam from the first or second link member and the urging member urges the cantilever member in the direction to bring the first and second cam portions into contact with each other. By the contact state of the first cam portion of the first link member and the second cam portion of the second link member and the cooperative operation of the urging member which urges the cantilever member, the key top is urged upward and held in the non-depressed position and the key top can be returned to the non-depressed position upon cancellation of depression. Accordingly, the key switch device can be constructed without use of a rubber spring and a complicated urging mechanism, thus achieving a cost reduction. The urging member urges the cantilever member, so that the first and second cam portions are constantly held in contact with each other with the contact position varying in response to the vertical movement of the key top. By changing the shapes of the first and second cam portions as needed, therefore, it is possible to freely design the click touch which occurs during the key operation.

Furthermore, the cantilever member is elastically urged by the urging member so that one of the first and second cam portions supported on the cantilever member is brought into contact with the other cam portion. The elastic force to bring the first and second cam portions into contact with each other is produced based on the elastic force of the cantilever member and the elastic force of the urging member.

At this time, the contact portions of the first and second cam portions may wear due to the repeated switching operation in the switching section based on the depression operation of the key top, which reduces the initial urging force which is exerted on the cantilever member through the urging member. The first and second cam portions each have the shape to cause the point of action of the urging force acting on the contact portions of the first and second cam portions to shift to a predetermined fixed point side of the urging member while the switching operation is repeatedly performed in the switching section. In the case where the contact portions wear, the point of action of the urging force comes close to the fixed point side of the urging member, increasing the urging force to be exerted on the cantilever member through the urging member. Thus, the reduction in the initial urging force of the urging member due to wear of the contact portions of the first and second cam portions is cancelled out by an increment of the increased urging force when the point of action of the urging force in the contact portions comes close to the fixed point side of the urging member. Consequently, even if the switching operation is repeatedly performed for a long term, the depression characteristic of the key top can be surely prevented from being largely changed and can be stabilized. The switching operation can be ensured stably over a long term.

In the case where the elastic force of the cantilever member is reduced due to the repeated switching operation, similarly, the action point of the urging force of the urging member in the contact portions of the first and second cam portions comes close to the fixed point side of the urging member as mentioned above, which increases the urging force which is exerted on the cantilever member through the urging member. Accordingly, the increased urging force can compensate the reduction in the elastic force of the cantilever member. This also makes it possible to stabilize the depression characteristic of the key top.

Furthermore, the placing part for placing the urging member is provided in the first or second link member, so that the urging member can integrally be mounted in the first or second link member, thus achieving a size reduction of the whole key switch device.

The simple structure that the torsion spring having the first and second arm portions is used as the urging member, the first and second arm portions are held respectively by the first and second holding parts of the placing part to hold the first and second arm portions which provide the urging force to each other in the torsion spring. Accordingly, the urging force produced between the arm portions can be transmitted efficiently to the cantilever member.

Moreover, the first arm portion is movably held in the first holding part and the second arm portion fixedly held in the second holding part, so that the urging force generated in the torsion spring is transmitted to the cantilever member from the first arm portion being in contact with the cantilever member. At this time, the first arm portion being movably held in the first holding part, during the depression operation of the key top, the first arm portion flexibly moves in the first holding part in response to reactive force resulting from the contact force occurring between the first and second cam portions, while constantly holding the first and second cam portions in a contact relation.

Furthermore, one of the cam portions is formed with the first cam surface and the other is formed, at the contact portion with respect to the first cam surface, with the second cam surface which has a slanted surface and comes into contact with the first cam surface at an acute angle thereto in plan view. The clearance is provided to be open toward the fixed point side of the urging member from the contact portion between the first cam surface and the slanted surface. In the case where the acutely-angled second cam surface wears due to the repeated switching operation at the switching section in response to the depression operation of the key top, the second cam surface will wear in a direction that the clearance being between the first cam surface and the slanted surface is gradually closed toward the fixed point side of the urging member from the contact portions. As a result, the action point of the urging force of the urging member comes close to the fixed point side of the urging member, which increases the urging force to be exerted on the cantilever member through the urging member. Thus, even when the initial urging force of the urging member is reduced due to the wear of the second cam surface, the reduction in the initial urging force is compensated by an increment of the increased urging force when the action point of the urging force in the contact portions of the first and second cam portions comes close to the fixed point side of the urging member. Consequently, even if the switching operation is repeatedly performed for a long term, the depression characteristic of the key top can be prevented from being largely changed and can be stabilized, ensuring a stable switching operation over a long term.

(4) The keyboard according to the present invention is provided with at least two or more of the key switch devices according to the first invention, the second invention, or the third invention. The keyboard of the present invention being provided with the key switch device according to the first, second, or third invention can provide the same effects as those described about the first, second, and third inventions.

(5) The electronic device according to the present invention is characterized by including: a keyboard for inputting letters, symbols, and others, provided with a key switch device of the first invention including a key top and a pair of a first and a second link members movably disposed under the key top, for performing switching of a switching section while guiding a vertical movement of the key top by the first and second link members, the key switch including: a first cam portion formed in the first link member; a second cam portion formed in the second link member and disposed facing the first cam portion; a cantilever member formed in a cantilever beam shape extending from the first link member or the second link member to support at least one of the first cam portion and the second cam portion; and an urging member for elastically urging the cantilever member in which one of the cam portions is formed in a direction to bring the first cam portion and the second cam portion into contact with each other; display means for displaying the letters, symbols, and others; and control means for causing the display means to display the letter, symbols, and others based on the input data from the keyboard.

Furthermore, the electronic device according to the present invention is characterized by including: a keyboard for inputting letters, symbols, and others, provided with a key switch device of the second invention including a key top and a pair of a first and a second link members movably disposed under the key top, for performing switching of a switching section while guiding a vertical movement of the key top by the first and second link members, the key switch including: a first cam portion formed in the first link member; a second cam portion formed in the second link member and disposed facing the first cam portion; a first cantilever member formed in a cantilever beam shape extending from the first link member to support the first cam portion; a second cantilever member formed in a cantilever beam shape extending from the second link member to support the second cam portion; a first urging member for elastically urging the first cantilever member in a direction to bring the first cam portion and the second cam portion into contact with each other; and a second urging member for elastically urging the second cantilever member in a direction to bring the first cam portion and the second cam portion into contact with each other; display means for displaying the letters, symbols, and others; and control means for causing the display means to display the letter, symbols, and others based on the input data from the keyboard.

Moreover, the electronic device according to the present invention is characterized by including a keyboard for inputting letters, symbols, and others, provided with a key switch device of the third invention including a key top and a pair of a first and a second link members movably disposed under the key top, for performing switching of a switching section while guiding a vertical movement of the key top by the first and second link members, the key switch including: a first cam portion formed in the first link member; a second cam portion formed in the second link member and disposed facing the first cam portion; a cantilever member formed in a cantilever beam shape extending from the first link member or the second link member to support at least one of the first cam portion and the second cam portion; and an urging member for elastically urging the cantilever member in which one of the cam portions is formed in a direction to bring the first cam portion and the second cam portion into contact with each other, wherein the first cam portion and the second cam portion are brought into contact with each other at contact portions, the first cam portion and the second cam portion each have a shape to cause the point of action of the urging force of the urging member acting on the contact portions to shift to a predetermined fixed point side of the urging member in association with a repeated switching operation; display means for displaying the letters, symbols, and others; and control means for causing the display means to display the letter, symbols, and others based on the input data from the keyboard.

In the electronic device on which the key switch device of the first invention is mounted, when letters, symbols, etc. are input through the key switch devices provided in the keyboard, the letters, symbols, etc. are displayed in the display means under control of the control means based on the input data from the keyboard. At this time, this electronic device is provided with the keyboard including the key switch device according to the first invention. As in the case with the key switch device of the first invention, one of the first cam portion of the first link member and the second cam portion of the second link member is supported by the cantilever member extending like a cantilever beam from the first or second link member and the urging member urges the cantilever member in the direction to bring the first and second cam portions into contact with each other. By the contact state of the first cam portion of the first link member and the second cam portion of the second link member and the cooperative operation of the urging member which urges the cantilever member, the key top is urged upward to be held in the non-depressed position and the key top can be returned to the non-depressed position upon cancellation of depression. Accordingly, the key switch device can be constructed without use of a rubber spring and a complicated urging mechanism, thus achieving a cost reduction. The urging member urges the cantilever member, so that the first and second cam portions are constantly held in contact with each other with the contact position varying in response to the vertical movement of the key top. By changing the shapes of the first and second cam portions as needed, therefore, it is possible to freely design the click touch which occurs during the key operation. Furthermore, the cantilever member is elastically urged by the urging member so that one of the first and second cam portions supported on the cantilever member is brought into contact with the other cam portion. The elastic force to bring the first and second cam portions into contact with each other may be produced by the urging member. Accordingly, the cantilever member is not requested to have the elastic force. Thus, the cantilever member can be made of a resinous material at low cost and to be relatively flexible. Consequently, there is little possibility that creep occurs in the cantilever member even when the switching operation is performed for a long term, and the switching operation can be ensured stably over a long term.

In the electronic device on which the key switch device of the second invention is mounted, when letters, symbols, etc. are input through the key switch devices provided in the keyboard, the letters, symbols, etc. are displayed in the display means under control of the control means based on the input data from the keyboard. At this time, this electronic device is provided with the keyboard including the key switch device according to the second invention. As in the case with the key switch device of the second invention, the first cantilever member supporting the first cam portion of the first link member is urged by the first urging member and the second cantilever member supporting the second cam portion of the second link member is urged by the second urging member, respectively, in a direction to bring the first and second cam portions into contact with each other. Accordingly, by the contact state of the first and second cam portions and the cooperative operation of the first and second urging members which urge the first and second cantilever members respectively, the key top is urged upward to be held in the non-depressed position and the key top can be returned to the non-depressed position upon cancellation of depression. Accordingly, the key switch device can be constructed without use of a rubber spring and a complicated urging mechanism, thus achieving a cost reduction. The first and second urging members urge the first and second cantilever members, so that the first and second cam portions are constantly held in contact with each other with the contact position varying in response to the vertical movement of the key top. By changing the shapes of the first and second cam portions as needed, therefore, it is possible to freely design the click touch which occurs during the key operation. Furthermore, the first and second cantilever members are elastically urged by the first and second urging members so that the first and second cam portions supported on the cantilever members are brought into contact with each other. The elastic force to bring the first and second cam portions into contact with each other may be produced by the first and second urging members. Accordingly, the first and second cantilever members are not requested to have the elastic force. Thus, each cantilever member can be made of a resinous material at low cost and to be relatively flexible. Consequently, there is little possibility that creep occurs in each cantilever member even when the switching operation is performed for a long term, and the switching operation can be ensured stably over a long term.

Moreover, in the electronic device on which the key switch device of the third invention is mounted, when letters, symbols, etc. are input through the key switch devices provided in the keyboard, the letters, symbols, etc. are displayed in the display means under control of the control means based on the input data from the keyboard. At this time, this electronic device is provided with the keyboard including the key switch device according to the third invention. As in the case with the key switch device of the third invention, one of the first cam portion of the first link member and the second cam portion of the second link member is supported by the cantilever member extending like a cantilever beam from the first or second link member and the urging member urges the cantilever member in the direction to bring the first and second cam portions into contact with each other. By the contact state of the first cam portion of the first link member and the second cam portion of the second link member and the cooperative operation of the urging member which urges the cantilever member, the key top is urged upward to be held in the non-depressed position and the key top can be returned to the non-depressed position upon cancellation of depression. Accordingly, the key switch device can be constructed without use of a rubber spring and a complicated urging mechanism, thus achieving a cost reduction. The urging member urges the cantilever member, so that the first and second cam portions are constantly held in contact with each other with the contact position varying in response to the vertical movement of the key top. By changing the shapes of the first and second cam portions as needed, therefore, it is possible to freely design the click touch which occurs during the key operation. Furthermore, the cantilever member is elastically urged by the urging member so that one of the first and second cam portions supported on the cantilever member is brought into contact with the other cam portion. The elastic force to bring the first and second cam portions into contact with each other is produced based on the elastic force of the cantilever member and the elastic force of the urging member. At this time, the contact portions of the first and second cam portions may wear due to the repeated switching operation at the switching section based on the depression operation of the key top, which reduces the initial urging force to be exerted on the cantilever member through the urging member. The first and second cam portions each have the shape to cause the point of action of the urging force acting on the contact portions of the first and second cam portions to shift to a predetermined fixed point side of the urging member. In the case where the contact portions wear, the point of action of the urging force comes close to the fixed point side of the urging member, increasing the urging force to be exerted on the cantilever member through the urging member. Thus, the reduction in the initial urging force of the urging member due to wear of the contact portions of the first and second cam portions is cancelled out by an increment of the increased urging force when the point of action of the urging force in the contact portions comes close to the fixed point side of the urging member. Consequently, even if the switching operation is repeatedly performed for a long term, the depression characteristic of the key top can be surely prevented from being largely changed and can be stabilized. The switching operation can be ensured stably over a long term. In the case where the elastic force of the cantilever member is reduced due to the repeated switching operation, similarly, the action point of the urging force of the urging member in the contact portions of the first and second cam portions comes close to the fixed point side of the urging member as mentioned above, which increases the urging force to be exerted on the cantilever member through the urging member. Accordingly, the increased urging force can compensate the reduction in the elastic force of the cantilever member. This also makes it possible to stabilize the depression characteristic of the key top.

BRIEF DESCRIPTION OF DRAWINGS

FIG. 1 to FIG. 5 are views for explaining a key switch device, a keyboard, and a notebook-size personal computer in a first embodiment; FIG. 1A is a perspective view of the notebook-size personal computer and FIG. 1B is a block diagram showing an electric structure of the notebook-size personal computer; FIG. 2 is an exploded perspective view of the key switch device in the first embodiment; FIG. 3 is plan views and side views of a first and a second link members; FIG. 4 is a plan view of a torsion spring; FIG. 5A shows the non-depressed state of the key top, FIG. 5B shows an early state of depression of the key top, and FIG. 5C shows a final state of depression of the key top.

FIG. 6 to FIG. 8 are views for explaining a key switch device in a second embodiment; FIG. 6 is an exploded perspective view of the key switch device in the second embodiment; FIG. 7 is a plan view and a side view of a first and a second link members; FIG. 8A shows the non-depressed state of the key top, FIG. 8B shows an early state of depression of the key top, and FIG. 8C shows a final state of depression of the key top.

Furthermore, FIG. 9 to FIG. 13 are views for explaining a key switch device in a third embodiment; FIG. 9 is an exploded perspective view of the key switch device in the third embodiment; FIG. 10 is a plan view and a side view of a first and a second link members; FIG. 11A shows the non-depressed state of the key top, FIG. 11B shows an early state of depression of the key top, and FIG. 11C shows a final state of depression of the key top; FIG. 12 is an explanatory view schematically showing a contact state of a first cam portion 24A and a second cam portion 24B in plan and enlarged view; and FIG. 13 is an explanatory view schematically showing a state where the point of action of urging force of a torsion spring comes close to a fixed point 64 side when a depression operation of the key top is repeatedly performed.

BEST MODE FOR CARRYING OUT THE INVENTION

Figure 1A:
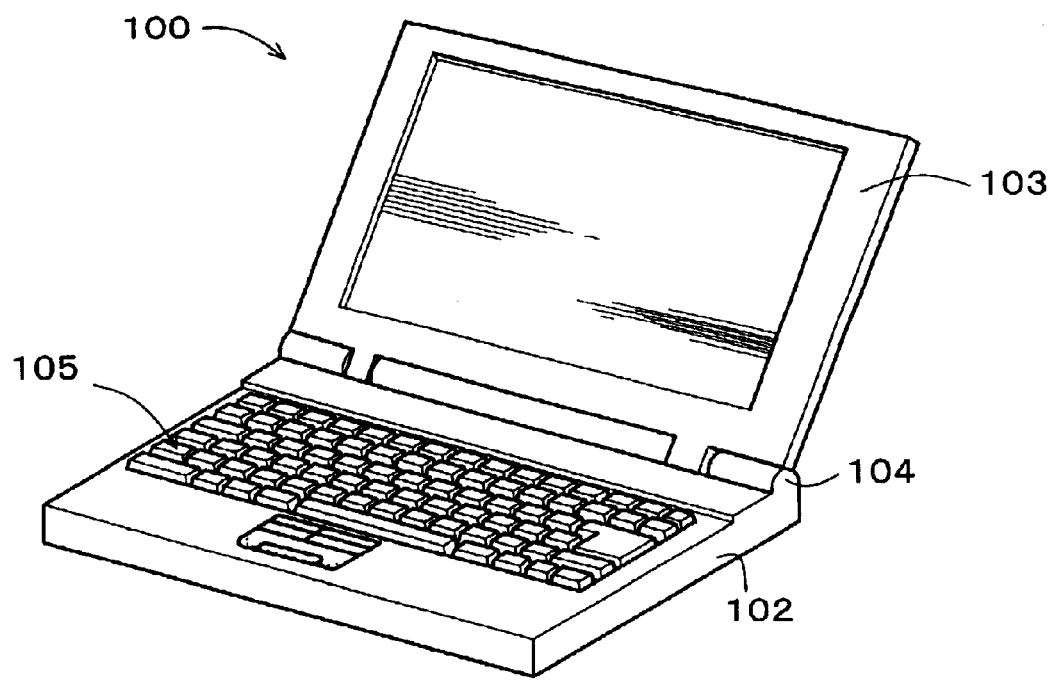
FIG. 1A and FIG. 1B show the personal computer.
Figure 1B:
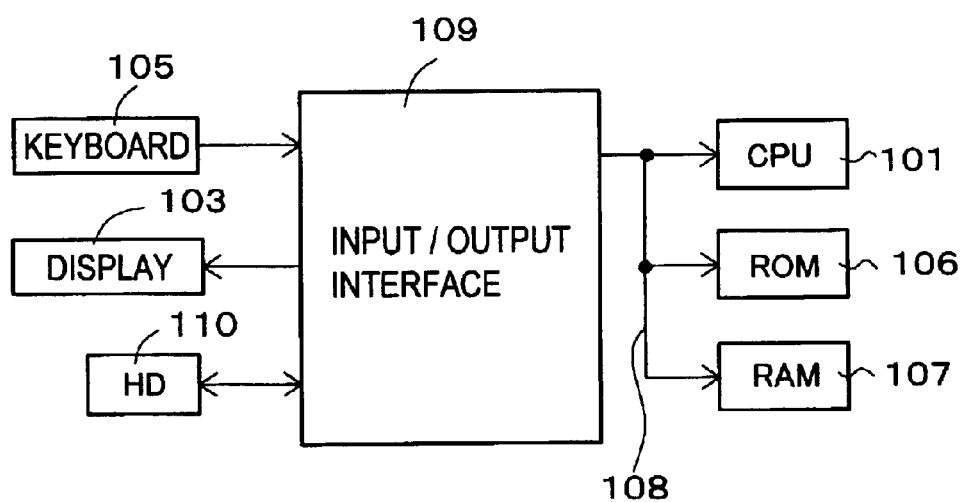

A detailed description of a first preferred embodiment of a key switch device, a keyboard and an electronic device according to the present invention will now be given referring to the accompanying drawings. At first, explanation is made on a notebook-size personal computer which is one of the electronic devices in the present embodiment with reference to FIG. 1A and FIG. 1B. FIG. 1A and FIG. 1B show the notebook-size personal computer; FIG. 1A is a perspective view of the notebook-size personal computer and FIG. 1B is a block diagram showing an electric structure of the notebook-size personal computer.

In FIG. 1A, a notebook-size personal computer 100 is mainly constructed of a main unit 102 including a CPU which conducts various kinds of processing and a display 103 supported to be allowed to open and close with respect to the main unit 102. This display 103 is supported rotatably by a joint portion 104 of the main unit 102, so that the display 103 is allowed to open and close with respect to the main unit 102. The main unit 102 is provided with a keyboard 105 on which a plurality of key switch devices 1 are arranged.

In FIG. 1B, a CPU 101 is connected through a bus 108 to a ROM 106 which stores programs for controlling each section of the personal computer 100 and a RAM 107 for storing various data. An input and output interface 109 is also connected to the CPU 101 through the bus 108. To this input and output interface 109, the display 103, the keyboard 105, and a hard disc 110 which stores programs such as a word processing program, a spreadsheet program, and others are connected. The CPU 101 executes a program, such as the word processing program, the spreadsheet program, etc. read out of the hard disc 110 based on the input data from the keyboard 105, and causes the display 103 to display letters, symbols, and others.

Figure 2:
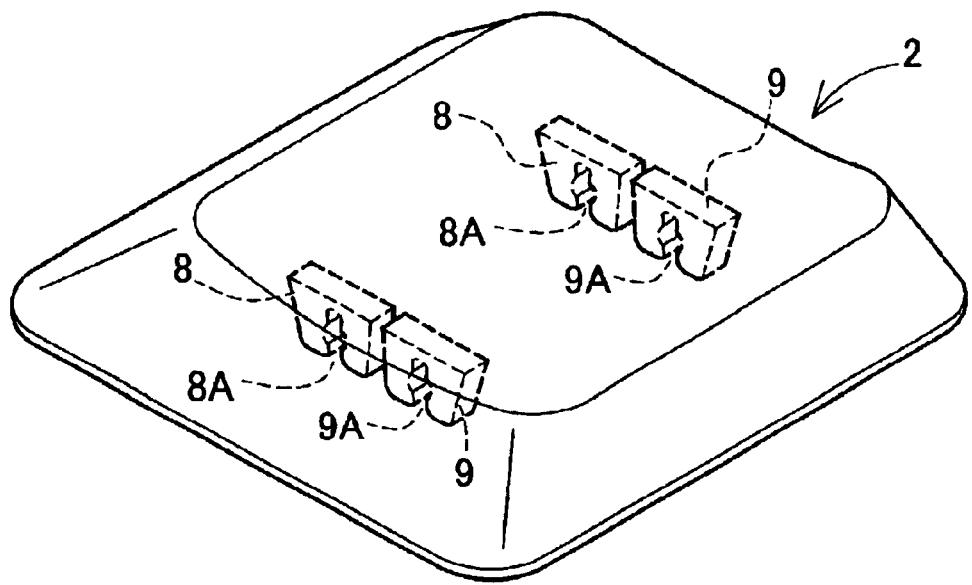
Figure 2:
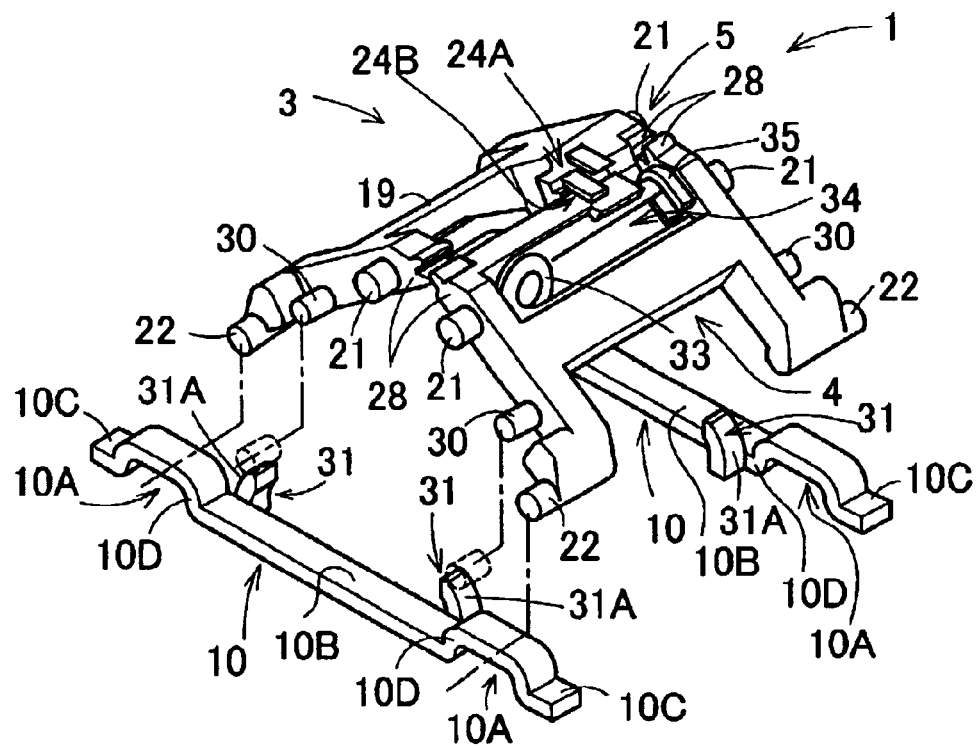

Next, explanation is made on a schematic structure of a key switch device according to the first embodiment provided in the keyboard 105 of the notebook-size personal computer 100, referring to FIG. 2. FIG. 2 is an exploded perspective view of the key switch device.

In FIG. 2, at first, the key switch device 1 is mainly constructed of a key top 2, a guide member 5 constructed of a pair of a first link member 3 and a second link member 4 to guide the vertical movement of the key top 2, and a membrane switch sheet 7 (see FIG. 5A to FIG. 5C) disposed on a support plate 6 under the guide member 5.

The key top 2 is made of ABS resin and the like and provided with a character such as a letter, numerical, etc. printed on the surface. On the underside of the key top 2, two rotation engagement portions 8, 8 corresponding to the first link member 3 are integrally provided with the key top 2 and also two rotation engagement portions 9, 9 corresponding to the second link member 4 are integrally provided with the key top 2. The rotation engagement portions 8, 9 are formed with engagement recesses 8A, 9A, respectively. The engagement recess 8A of each rotation engagement portion 8 rotatably engages an upper shaft 21 (mentioned later) of the first link member 3 and the engagement recess 9A of each rotation engagement portion 9 rotatably engages an upper shaft 21 (mentioned later) of the second link member 4. Furthermore, the key top 2 is provided at its underside with a concave portion 50 as shown in FIGS. 5a to 5C and FIGS. 8A to 8C. This concave portion 50 holds the upper ends of the first link member 3 and the second link member 4 to serve to stably position the first link member 3 and the second link member 4 in correspondence with the non-depressed state of the key top 2.

The guide member 5 is constituted of a combination of the first link member 3 and the second link member 4. The first and second link members 3 and 4 have a similar structure to each other. It is to be noted that each detailed structure of the first link member 3 and the second link member 4 will be mentioned later.

Figure 5A:
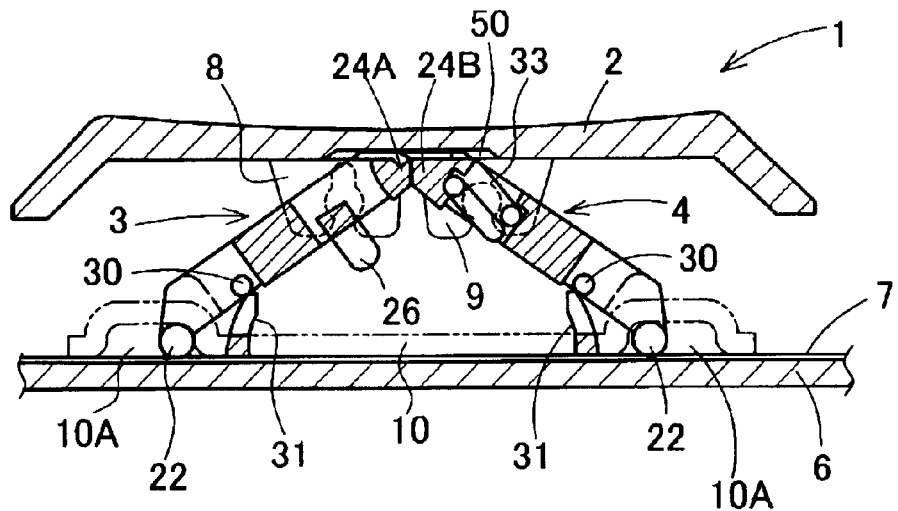
FIG. 5A to FIG. 5C are explanatory views schematically showing a series of movements from a non-depressed state of a key top to a depressed state for performing a switching operation with a focus on movements of the first and second link members.
Figure 5B:
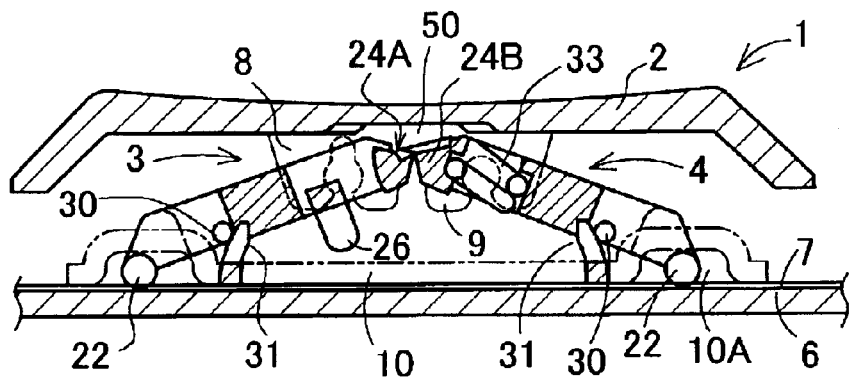
Figure 5C:
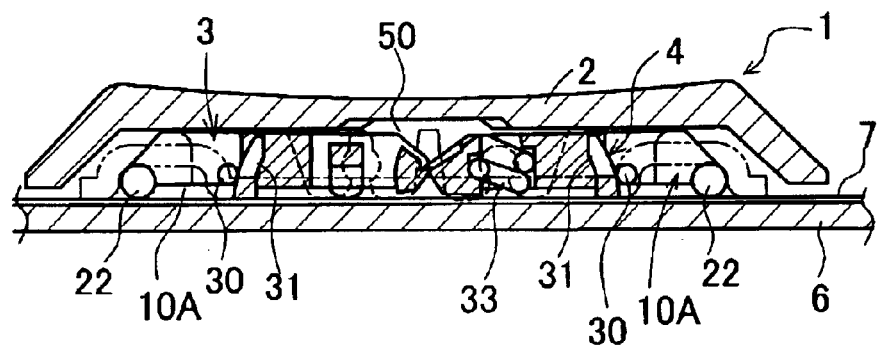

Moreover, under the guide member 5, as shown in FIGS. 5a to 5C, the membrane switch sheet 7 is provided on the support plate 6 made of a metallic thin plate formed of aluminum, iron, and the like. The membrane switch sheet 7 has a so-called three-layer structure including a lower film sheet on which a switch circuit pattern including a fixed electrode pattern is formed of copper foil, electrically conductive coating, and the like, an upper film sheet on its under surface of which a movable electrode pattern is similarly formed, and a film spacer arranged between the upper and lower film sheets, the film spacer being provided with a switching hole positioned in correspondence with the fixed electrode pattern and the movable electrode pattern. The structure of the membrane switch sheet has been well known and is identical to the structure disclosed in the specification and drawings of Japanese patent application No. 2000-99148. The detailed explanation thereof is herein omitted.

On the upper switch sheet, two engagement members 10 each made of metal, resin, etc. in a chip shape and are fixedly adhered on both sides of the movable electrode pattern by adhesive. Each engagement member 10 has an identical structure in which an engagement groove 10A having a long hole shape is formed on both sides of a fixedly adhered part 10B centrally located. At the outside of each engagement groove 10A, a fixedly adhered part 10C is provided. Each engagement member 10 is disposed below the side edge of the key top 2, which is deviated from the center of the key top 2.

The engagement grooves 10A slidably engage a lower shaft 22 of the first link member 3 and a lower shaft 22 of the second link member 4, individually. Wall portions 10D come into contact with the lower shaft 22 of the first link member 3 and the lower shaft 22 of the second link member 4 to restrain the key top 2 in the non-depressed position.

Each engagement member 10 is integrally formed with a wall member 31 near an inner side end of each engagement groove 10A. Each wall member 31 has a shaft-restricting curved surface 31A. A restricting projection 30 formed in each plate member 18 mentioned later of the first link member 3 and the second link member 4 is constantly in contact with the shaft-restricting surface 31A of the wall member 31. It is to be noted that the engagement member 10 and the wall member 31 may also be formed integrally with the support plate 6 made of a metallic thin plate when the support plate 6 is punched and pressed.

The structure of fixedly adhering each engagement member 10 on the upper surface of the upper film sheet of the membrane switch sheet 7 is identical to that disclosed in the specification and drawings of Japanese patent application No. 11-32608 and therefore its detailed explanation is referred to the specification and drawings of Japanese patent application No. 11-32608 and the explanation is herein omitted.

Figure 3:
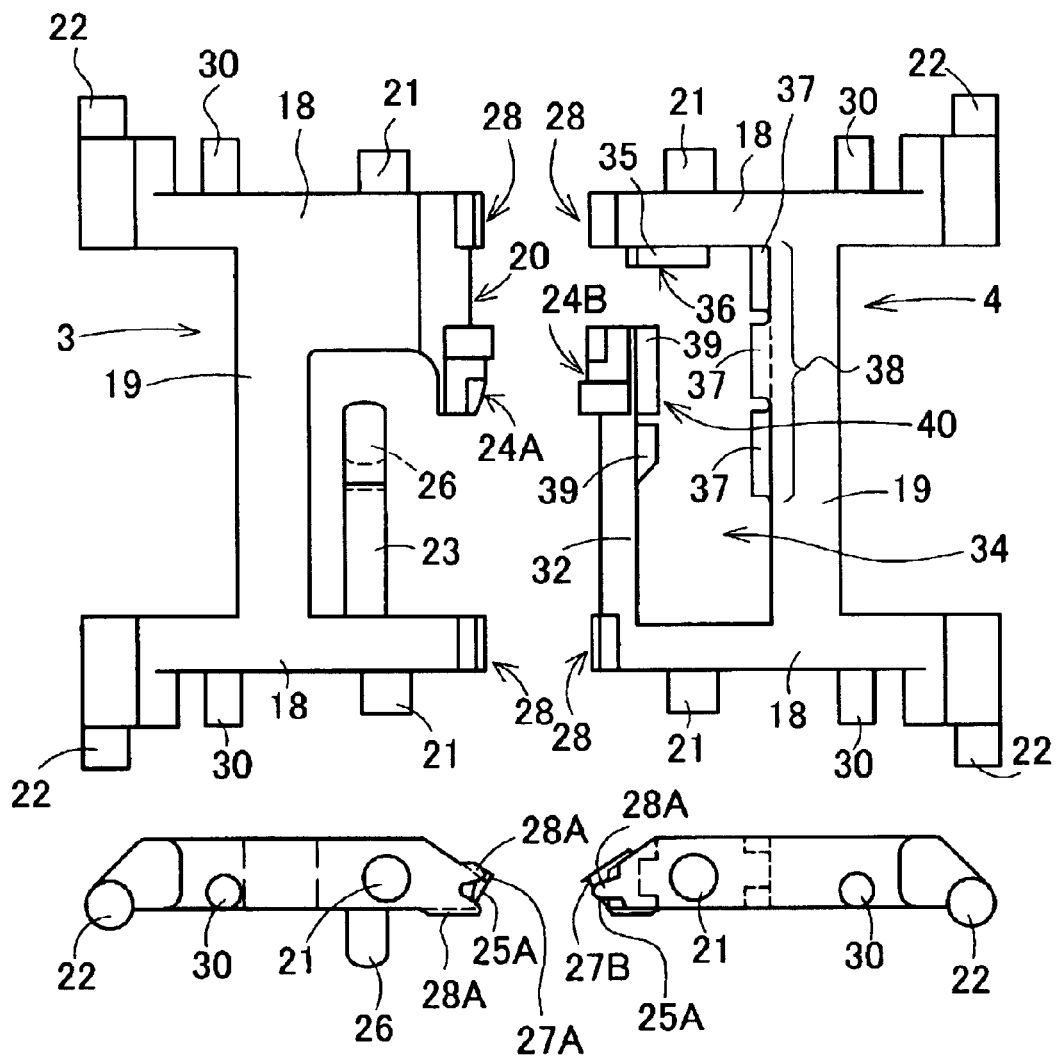

Next, the detailed structures of the first link member 3 and the second link member 4 constituting the guide member 5 are described with reference to FIG. 2 and FIG. 3. These first link member 3 and second link member 4 are slightly different in structure. FIG. 3 is plan views and side views of the first link member 3 and the second link member 4.

In FIG. 2 and FIG. 3, the first link member 3 is structured of a pair of plate members 18, 18, a joint portion 19 joining the plate members 18, and an extended part 20 which is formed extending inward from one end of the plate member 18 at a position near the base of the joint portion 19, which are integrally made of polyacetal resin, etc. as a unit. The upper shaft 21 is provided extending outward from each plate member 18 at one end side (an upper end in FIG. 2 and a right end in FIG. 3). The lower shaft 22 is provided extending outward from each plate member 18 at the other end side (a lower end in FIG. 2 and a left end in FIG. 3). Each upper shaft 21 is rotatably engaged in the engagement groove 8A of the rotation engagement portion 8 of the key top 2. Each lower shaft 22 is slidably engaged in the engagement groove 10A of the engagement member 10 fixedly adhered on the surface of the upper film sheet of the membrane switch sheet 7.

The extended part 20 is integrally formed at its outer end with a first cam portion 24A. The first cam portion 24A is formed at its lower side with a cam surface 25A as shown in the side view of FIG. 3. A cam apex 27A exists at the boundary between this cam surface 25A and a continuous surface from the cam surface 25A. This cam surface 25A corresponds to the non-depressed position of the key top 2 as is clear from FIGS. 5A to 5C. It is to be noted that, not shown in the side view of FIG. 3, a cam concave portion 27B is provided adjacently to the cam apex 27A in the first cam portion 24A (see the side view of the second link member 4 in FIG. 3). In this regard, the structure of the first cam portion 24A is identical to that of a second cam portion 24B of the second link member 4 mentioned later.

Each plate member 18 is provided with a gear portion 28 arranged nearer the end side than the upper shaft 21 (a right end side in FIG. 2 and FIG. 3). The gear portion 28 has one gear tooth or two gear teeth 28A. In the side views of FIG. 3, the gear portion 28 of one of the plate members 18 is formed with one gear tooth 28A, while the gear portion 28 of the other plate member 18 is formed with two gear teeth 28A. It is to be noted that the gear teeth 28A of the first link member 3 and the second link member 4 are engaged with each other to function for synchronously operating the first link member 3 and the second link member 4 in association with the vertical movement of the key top 2.

Moreover, one of the plate members 18 (the lower plate member 18 in FIG. 3) is integrally formed with an elastic resinous piece 23 extending from the inner wall to almost the center of a distance between the plate members 18. This elastic resinous piece 23 is provided at its lower end with a switch pressing part 26. The switch pressing part 26 of the elastic resinous piece 23, as mentioned later, elastically presses the movable electrode pattern on the upper switch sheet of the membrane switch sheet 7 from above when the key top is depressed, thereby performing a switching operation with respect to the fixed electrode pattern on the lower film sheet.

The restricting projection 30 is formed extending outward from the side surface of each plate member 18 of the first link member 3. This restricting projection 30 is always in contact with the shaft-restricting surface 31A of the wall member 31 provided in the engagement member 10 as mentioned above.

Figure 4:
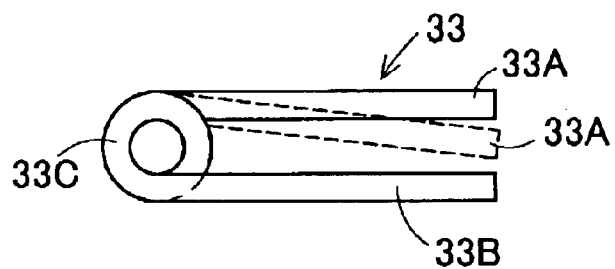

Successively, the structure of the second link member 4 is described with reference to FIGS. 2 to 4. FIG. 4 is a plan view of a torsion spring. It is to be noted that identical members and the like to those of the first link member 3 are explained with the same reference numerals.

In each figure, the second link member 4 is structured of a pair of plate members 18, 18, a joint portion 19 joining the plate members 18, and a cantilever member 32 formed in a cantilever beam shape extending inward from one end of one of the plate members 18 (a left end portion of the lower plate member 18 in FIG. 3), which are integrally made of polyacetal resin, etc. as a unit. An upper shaft 21 is provided extending outward from each plate member 18 at one end side (an upper end in FIG. 2 and a left end in FIG. 3). A lower shaft 22 is provided extending outward from each plate member 18 at the other end side (a lower end in FIG. 2 and a right end in FIG. 3). Each upper shaft 21 is rotatably engaged in the engagement groove 9A of the rotation engagement portion 9 of the key top 2. Each lower shaft 22 is slidably engaged in the engagement groove 10A of the engagement member 10 fixedly adhered on the surface of the upper film sheet of the membrane switch sheet 7.

The cantilever member 32 is integrally formed at its outer end with a second cam portion 24B. The second cam portion 24B is formed at its lower side with a cam surface 25A as shown in the side view of FIG. 3. A cam concave portion 27B exists at the boundary between the cam surface 25A and a continuous surface from the cam surface 25A so that the cam apex 27A of the first link member 3 comes into rotatable contact with the concave portion 27B. This cam surface 25A cooperates with the cam surface 25A of the first link member 3 for the non-depressed position of the key top 2, as is clear from FIGS. 5A to 5C. It is to be noted that, not shown in the side view of FIG. 3, a cam apex 27A is provided adjacently to the cam concave portion 27B in the second cam portion 24B (see the side view of the first link member 3 in FIG. 3). In this regard, the structure of the second cam portion 24B is identical to that of the first cam portion 24A of the first link member 3 mentioned above.

Each plate member 18 is provided with a gear portion 28 arranged nearer the end side than the upper shaft 21 (a left end side in FIG. 2 and FIG. 3). The gear portion 28 has one gear tooth or two gear teeth 28A. In the side views of FIG. 3, the gear portion 28 of one of the plate members 18 is formed with one gear tooth 28A, while the gear portion 28 of the other plate member 18 is formed with two gear teeth 28A.

Moreover, a restricting projection 30 is formed extending outward from the side surface of each plate member 18 of the second link member 4. This restricting projection 30 is always in contact with the shaft-restricting surface 31A of the wall member 31 provided in the engagement member 10 as mentioned above.

An area surrounded by the joint portion 19, each plate member 18, and the cantilever member 32 constitutes a spring placing section 34 in which a torsion spring 33 shown in FIG. 4 is placed. This torsion spring 33, as shown in FIG. 4, has a coil portion 33C between a first arm 33A and a second arm 33B to elastically urge the cantilever member 32 leftward in FIG. 3. In the spring placing section 34, a first holding part 36 having a U-shaped wall portion 35 (see FIG. 2) formed on the inner wall surface of one of the plate members 18, a second holding part 38 having three fixing pieces 37 formed in the joint portion 19, facing the cantilever member 32, and a third holding part 40 having two fixing pieces 39 formed on the inner surface of the cantilever member 32, facing each fixing piece 37.

The wall portion 35 of the first holding part 36 movably holds, within its U-shaped groove, the end of the first arm 33A of the torsion spring 33. Each fixing piece 37 of the second holding part 38 fixedly holds the second arm 33B. Each fixing piece 39 of the third holding part 40 fixedly holds the first arm 33A.

With the above structure, as mentioned later, the depression force resulting from the depression of the key top 2 acts on the first cam portion 24A of the first link member 3 and the second cam portion 24B of the second link member 4 which are in contact with each other. At this time, the extended part 20 of the first link member 3 is not elastically deformed, holding the first cam portion 24A in the same position, whereas the cantilever member 32 is deformed, which causes the second cam portion 24B to move rightward in FIG. 3 against the urging force of the torsion spring 33. In this state, the first arm 33A of the torsion spring 33 is fixedly held by each fixing piece 39 of the third holding part 40, and, the second arm 33B is fixedly held by each fixing piece 37 of the second holding part 38. The end of the first arm 33A is movable within the U-shaped groove of the wall portion 35 of the first holding part 36 in response to deformation of the cantilever member 32. When the second cam portion 24B is moved rightward in response to the deformation of the cantilever member 32, accordingly, the end of the first arm 33A is moved within the U-shaped groove of the wall portion 35. In this manner, the torsion spring 33 continuously urges the cantilever member 32 in a direction to bring the first cam portion 24A and the second cam portion 24B into contact with each other. Thus, the elastic force to bring the first cam portion 24A and the second cam portion 24B into contact with each other may be produced by the torsion spring 33, so that there is no need to produce the elastic force by the cantilever member 32. As a result, the cantilever member 32 can be made of a resinous material at low cost and to be relatively flexible. Consequently, there is little possibility that creep occurs in the cantilever member 32 even when the switching operation is performed for a long term, and the switching operation can be ensured stably over a long term.

Next explanation is made on the operation of the key switch device 1 in the first embodiment, referring to FIGS. 5A to 5C. FIGS. 5A to 5C are explanatory views schematically showing a series of movements of the key top 2 from the non-depressed state to the depressed state for performing a switching operation with a focus on movements of the first link member 3 and the second link member 4.

At first, in the non-depressed state where the key top 2 is not depressed, the key top 2 is held in the non-depressed position as shown in FIG. 5A. In this state, the cam surface 25A of the first cam portion 24A of the first link member 3 and the cam surface 25A of the second cam portion 24B of the second link member 4 are in contact relation with each other. In this contact state, the urging force of the torsion spring 33 acts in a direction to bring the cam surfaces 25A into contact with each other. Accordingly, as shown in FIG. 5A, the lower shaft 22 of the first link member 33 is brought into contact with the inner wall surface of the wall portion 10D of the engagement groove 10A of the engagement member 10 and similarly the lower shaft 22 of the second link member 4 is brought into contact with the inner wall surface of the wall portion 10D of the engagement groove 10A of the engagement member 10. Thus, the key top 2 is stably held in the non-depressed position. In the contact state where the cam surfaces 25A are in contact with each other, the urging force of the torsion spring 33 acts in a direction to bring the cam surfaces 25A into contact with each other. The key top 2 held in the non-depressed position will not be moved in a horizontal direction, thereby preventing rattles of the key top 2. At this time, the restricting projection 30 formed in each plate member 18 of the first link member 3 and the second link member 4 is in contact with the upper side of the shaft-restricting surface 31A of the wall member 31.

When the depression of the key top 2 is started, the upper shaft 21 of the first link member 3 is rotated clockwise in the engagement recess 8A of the rotation engagement portion 8 and the upper shaft 21 of the second link member 4 is rotated counterclockwise in the engagement recess 9A of the rotation engagement portion 9, in association of the depressing of the key top 2. Simultaneously, the lower shaft 22 of the first link member 3 is allowed to slide leftward in the engagement groove 10A of the engagement member 10 and the lower shaft 22 of the second link member 4 is allowed to slide rightward in the engagement groove 10A of the engagement member 10. At this time, each restricting projection 30 is guided along and in contact with the curved surface of the shaft-restricting surface 31A of the wall member 31. Accordingly, based on the cooperative operation of the restricting projection 30 and the shaft-restricting surface 31A of the wall member 31, the horizontal movement of the key top 2 can be restrained. Furthermore, the cam surface 25A of the first cam portion 24A of the first link member 3 and the cam surface 25A of the second cam portion 24B of the second link member 4 gradually come away from each other and then the cam apex 27A of the first cam portion 24A and the cam concave portion 27B of the second cam portion 24B come into contact with each other. This state is shown in FIG. 5B.

At this time, the cam apex 27A and the cam concave portion 27B, acting on each other for positioning, will not vertically misalign at all with each other. The first and second cam portions 24A and 24B can completely be synchronized.

When further depressed, the key top 2 is put into the state shown in FIG. 5C. The switch pressing part 26 formed in the elastic resinous piece 23 of the first link member 3 presses the upper film sheet of the membrane switch sheet 7. This causes the movable electrode pattern formed on the under surface of the upper film sheet to come into contact with the fixed electrode pattern of the lower film sheet through the switching hole of the film spacer, thereby performing a predetermined switching operation. At this time, each lower shaft 22 of the first link member 3 and the second link member 4 is brought into contact with the wall surface opposite to the wall portion 10D within the engagement groove 10A as shown in FIG. 5C.

The elastic resinous piece 23 is elastically deformed when the key top 2 is further depressed from the state shown in FIG. 5C. The elastic resinous piece 23 absorbs the amount of travel of the key top 2, which can achieve the so-called over travel of the key top 2.

When the depression of the key top 2 is cancelled after execution of the switching operation as described above, the interaction between the first cam portion 24A of the first link member 3 and the second cam portion 24B of the second link member 4 and the cooperative operation of the urging force of the torsion spring 33 cause the key top 2 to perform a reverse movement to return to the non-depressed position shown in FIG. 5A.

The behavior of the torsion spring 33 during the above mentioned depressing operation of the key top is explained. At first, in the non-depressed position of the key top 2 shown in FIG. 5A, the torsion spring 33 continuously urges the cantilever member 32 in a direction to bring the first cam portion 24A and the second cam portion 24B into contact with each other. This urging force of the torsion spring 33 causes the respective cam surfaces 25A of the first cam portion 24A and the second cam portion 24B to come into contact with each other, thereby holding the key top 2 in the non-depressed potion. At this time, the first arm 33A of the torsion spring 33, as shown in FIG. 2, is in contact with an end portion (a closed portion) of the U-shaped groove of the wall portion 35.

When the key top 2 is depressed, the depressing force based on the depression acts on the first cam portion 24A of the first link member 3 and the second cam portion 24B of the second link member 4 which are in contact with each other. At this time, the extended portion 20 of the first link member 3 is not elastically deformed, which holds the first cam portion 24A in the same position, whereas the cantilever member 32 is deformed, thus moving the second cam portion 24B rightward in FIG. 3 against the urging force of the torsion spring. In this state, the first arm 33A of the torsion spring 33 is fixedly held by each fixing piece 39 of the third holding part 40 and the second arm 33B is fixedly held by each fixing piece 37 of the second holding part 38. The end of the first arm 33A is moved within the U-shaped groove of the wall portion 35 to the open side thereof in association with the deformation of the cantilever member 32.

When the depression of the key top 2 is cancelled, the first arm 33A of the torsion spring 33 is moved by its elastic force from the open side of the wall portion 35 to the end side of the U-shaped groove and finally is engaged in contact with the end of the U-shaped groove.

As explained in detail above, the key switch device 1 according to the first embodiment is constructed such that the second cam portion 24B of the second link member 4 is supported by the cantilever member 32 extended like a cantilever beam from the second link member 4 and the cantilever member 32 is urged by the torsion spring 33 in the direction to bring the first cam portion 24A of the first link member 3 and the second cam portion 24B into contact with each other. By the contact state of the first cam portion 24A of the first link member 3 and the second cam portion 24B of the second link member 4 and the cooperative operation of the torsion spring 33 urging the cantilever member 32, the key top 2 can be urged upward to be held in the non-depressed position and also the key top 2 is allowed to return to the non-depressed position at the time of cancellation of the depression. Accordingly, the key switch device 1 can be constructed without use of a rubber spring and a complicated urging mechanism, which can achieve a cost reduction. Moreover, the torsion spring 33 urges the cantilever member 32 and therefore the first cam portion 24A and the second cam portion 24B are continuously in contact with each other with the contact position varying in response to the vertical movement of the key top 2. By changing the shapes of the first cam portion 24A and the second cam portion 24B as needed, therefore, it is possible to freely design the click touch which occurs during the key operation.

Furthermore, the cantilever member 32 is elastically urged by the torsion spring 33 so that the second cam portion 24B supported by the cantilever member 32 is held in contact with the first cam portion 24A. The elastic force to cause the first cam portion 24A and the second cam portion 24B to come into contact with each other may be produced by the torsion spring 33. Accordingly, the cantilever member 32 is not requested to have the elastic force. Thus, the cantilever member 32 can be made of a resinous material at low cost and to be relatively flexible. Consequently, there is little possibility that creep occurs in the cantilever member 32 even when the switching operation is performed for a long term, and the switching operation can be ensured stably over a long term.

Furthermore, the placing part 34 for placing the torsion spring 33 is provided in the second link member 4, so that the torsion spring 33 can integrally be mounted in the second link member 4, which can achieve a size reduction of the whole key switch device 1.

The torsion spring 33 having the first arm 33A and the second arm 33B is used as the urging member for bringing the first cam portion 24A and the second cam portion 24B into contact with each other and the first arm 33A is held by the wall portion 35 of the first holding part 36 in the spring placing section 34 while the second arm 33B is held by the fixing pieces 37 of the second holding part 38, thus holding the first arm 33A and the second arm 33B which provide the urging force to each other in the torsion spring 33. This simple structure makes it possible to efficiently transmit the urging force produced between the arm portions 33A and 33B to the cantilever member 32.

Moreover, the first arm 33A is movably held in the U-shaped groove of the wall portion 35 of the first holding part 36 and the second arm 33B is fixedly held by each fixing piece 37 of the second holding part 38, so that the urging force generated by the torsion spring 33 is transmitted from the first arm 33A being in contact with the cantilever member 32 to the cantilever member 32. At this time, the first arm 33A being movably held in the U-shaped groove of the wall portion 35 of the first holding part 36, during the depressing operation of the key top 2, the first arm 33A is allowed to flexibly move in the first holding part 36 in response to the reactive force resulting from the contact force occurring between the first cam portion 24A and the second cam portion 24B, while constantly holding the first cam portion 24A and the second cam portion 24B in a contact relation.

In addition, there are provided the restricting projection 30 formed extending from the side surface of each plate member 18 of the first link member 3 and the second link member 4 and the wall member 31 having the shaft-restricting curved surface 31A integrally provided to the engagement member 10 near the inner side end of each engagement groove 10A, so that the horizontal movement of the key top can be restrained based on the cooperative operation between the restricting projection 30 and the shaft-restricting surface 31A of the wall member 31. There is no need to provide a guide wall, a positioning member, and the like of a relatively larger height to restrain the horizontal movement of the key top 2 in the course of depression. Consequently, a cost reduction can be achieved by the simple structure.

Figure 6:
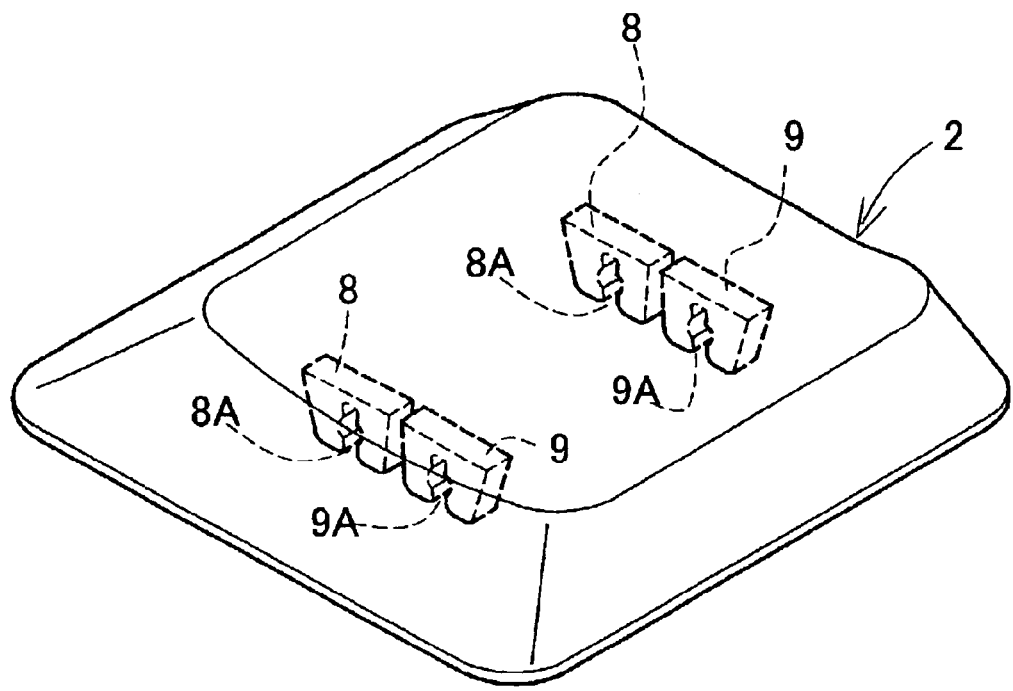
Figure 6:
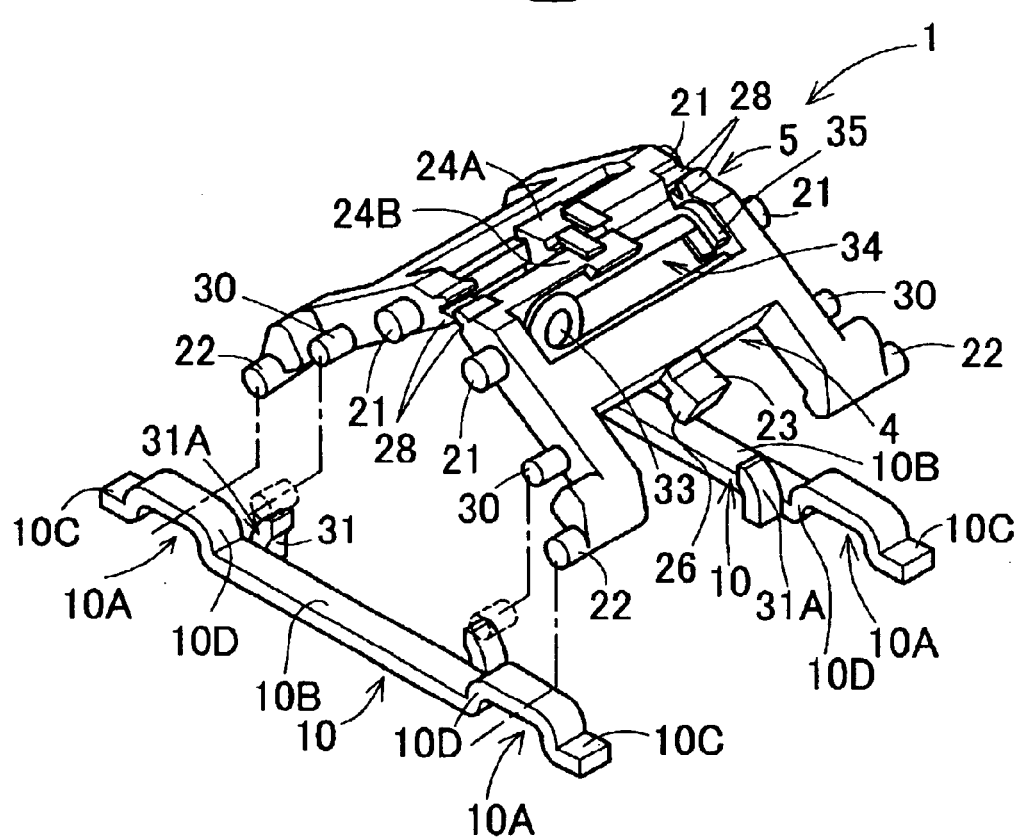
Figure 7:
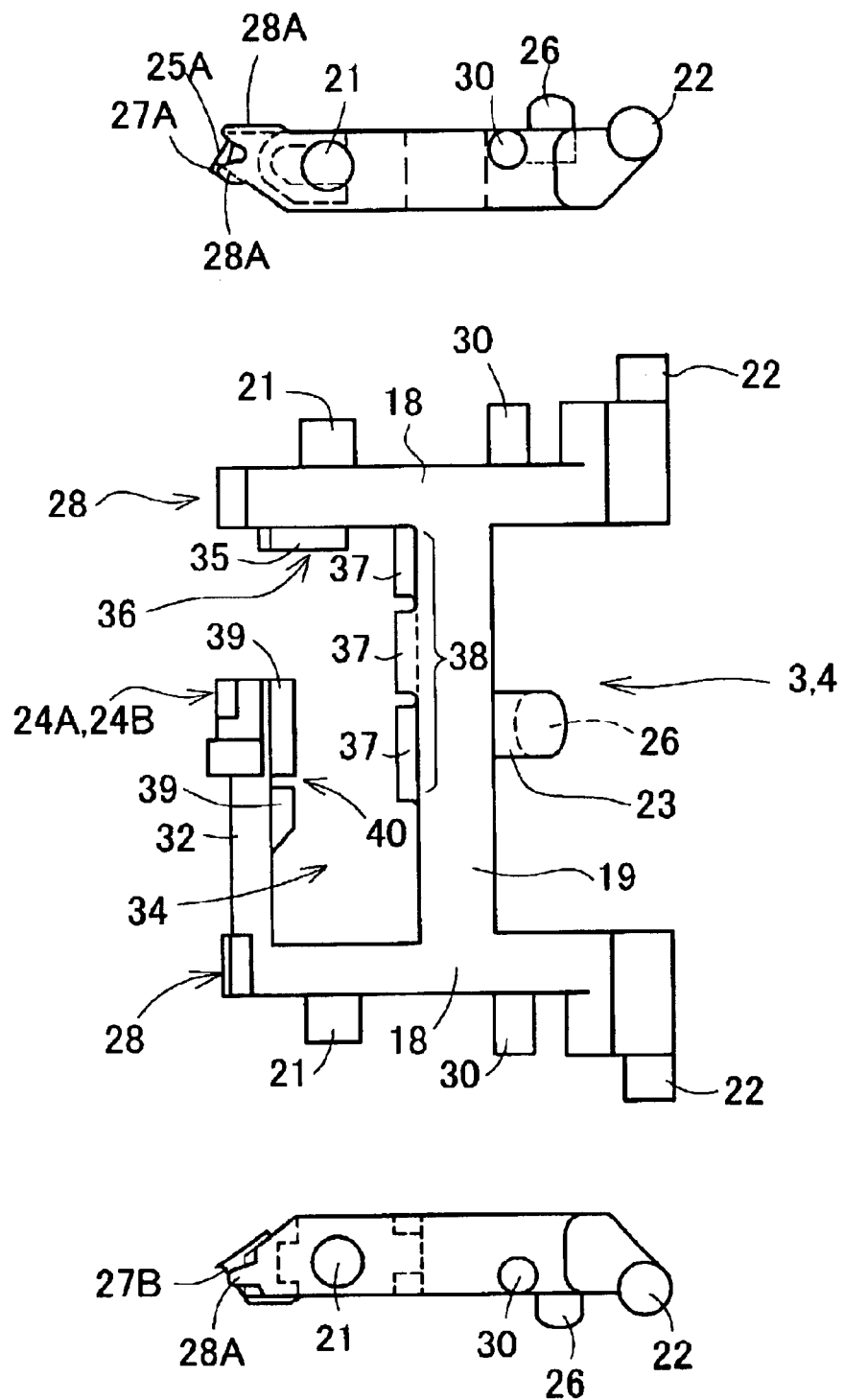

A key switch device in a second embodiment, provided in the keyboard 105 of the notebook-size personal computer 100 mentioned above is explained below with reference to FIGS. 6 to 8. The key switch device in the second embodiment differs from the key switch device 1 in the first embodiment in the following points. That is, in the key switch device 1 in the first embodiment, the first link member 3 and the second link member 4 have different structures and the torsion spring 33 is placed in only the second link member 4. The key switch device in the second embodiment is constructed such that a first link member and a second link member have identical structures and a torsion spring is placed in each link member. In other words, in the second embodiment, the second link member 4 in the key switch device 1 in the first embodiment is used as a pair of link members constituting a guide member for guiding and supporting the vertical movement of a key top. Other elements of the key switch device in the second embodiment are identical to those of the key switch device in the first embodiment, and therefore identical elements, members, and others are explained with the same reference numerals, with their explanation being omitted. In FIGS. 6 to 8, considering explanatory convenience, the structures of the restricting projection 30 and the wall member 31 are not shown.

Figure 8A:
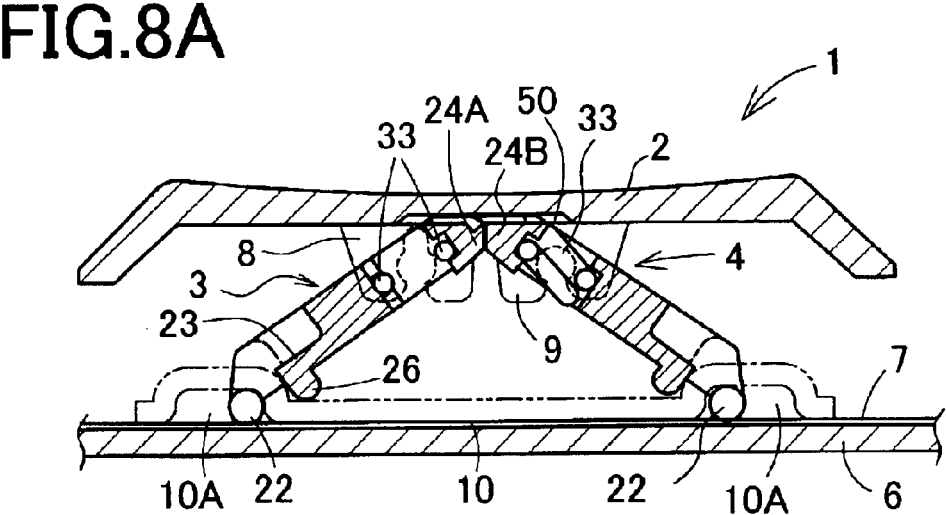
FIG. 8A to FIG. 8C are explanatory views schematically showing a series of movements of a key top in a non-depressed state to a depressed state for performing a switching operation with a focus on movements of the first and second link members.
Figure 8B:
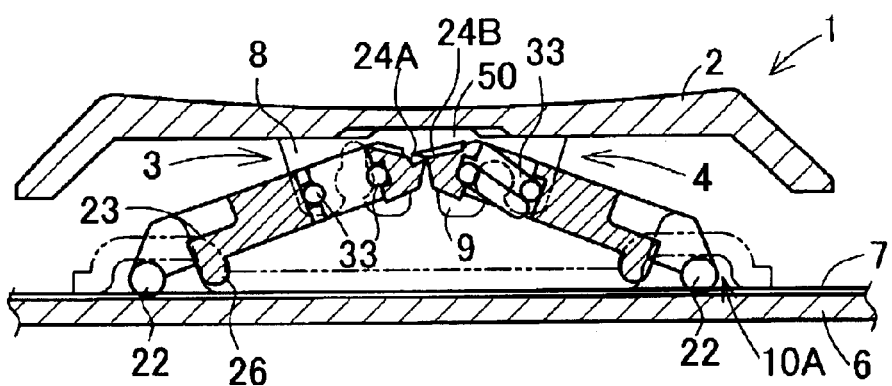
Figure 8C:
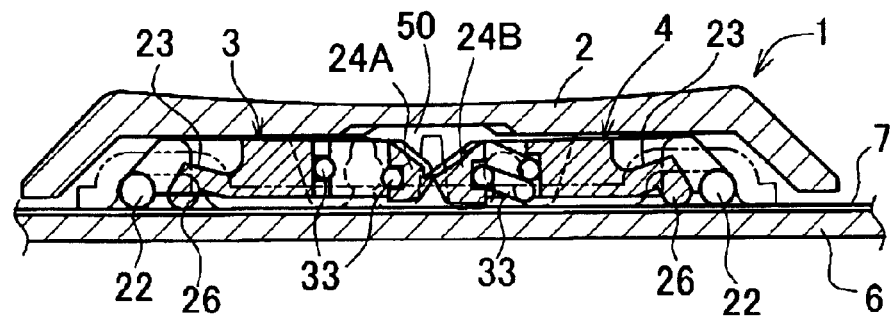

It is to be noted that FIG. 6 is an exploded perspective view of the key switch device in the second embodiment; FIG. 7 is a plan view and side views of the first link member and the second link member; FIG. 8A to FIG. 8C are explanatory views schematically showing a series of movements of the key top in a non-depressed state to a depressed state for performing a switching operation with a focus on movements of the first and second link members.

In each figure, a first link member 3 and a second link member 4 which constitute a guide member 5 of the key top 2 have identical structures. The first link member 3 and the second link member 4 are each structured of a pair of plate members 18, 18, a joint portion 19 joining the plate members 18, and a cantilever member 32 formed in a cantilever beam shape extending inward from one end of one of the plate members 18 (a left end portion of the lower plate member 18 in FIG. 7), which are integrally made of polyacetal resin, etc. as a unit. An upper shaft 21 is provided extending outward from each plate member 18 at one end side (an upper end in FIG. 6 and a left end in FIG. 7). A lower shaft 22 is provided extending outward from each plate member 18 at the other end side (a lower end in FIG. 6 and a right end in FIG. 7). Each upper shaft 21 is rotatably engaged in an engagement groove 9A of a rotation engagement portion 9 of the key top 2. Each lower shaft 22 is slidably engaged in an engagement groove 10A of an engagement member 10 fixedly adhered on the surface of an upper film sheet of a membrane switch sheet 7.

The cantilever member 32 is integrally formed at its outer end with a second cam portion 24B. The second cam portion 24B is formed at its lower side with a cam surface 25A as shown in the side view of FIG. 7. A cam concave portion 27B exists at the boundary between this cam surface 25A and a continuous surface from the cam surface 25A so that the cam apex 27A of the first link member 3 comes into rotatable contact with the concave portion 27B. The cam surface 25A cooperates with the cam surface 25A of the first link member 3 for the non-depressed position of the key top 2, as is clear from FIGS. 8A to 8C.

Each plate member 18 is provided with a gear portion 28 arranged nearer the end side than the upper shaft 21 (a left end side in FIG. 6 and FIG. 7). The gear portion 28 has one gear tooth or two gear teeth 28A. In the side views of FIG. 7, the gear portion 28 of one of the plate members 18 is formed with one gear tooth 28A, while the gear portion 28 of the other plate member 18 is formed with two gear teeth 28A.

Moreover, a restricting projection 30 is formed extending outward from the side surface of each plate member 18 of the first link member 3. This restricting projection 30 is always in contact with the shaft-restricting surface 31A of the wall member 31 provided in the engagement member 10 as mentioned above.

An elastic resinous piece 23 is integrally formed in substantially the center portion of the joint member 19. This elastic resinous piece 23 is provided at its lower end with a switch pressing part 26. The switch pressing part 26 of the elastic resinous piece 23, as mentioned later, elastically presses the movable electrode pattern on the upper switch sheet of the membrane switch sheet 7 from above when the key top 2 is depressed, thereby performing a switching operation with respect to the fixed electrode pattern on the lower film sheet. It is to be noted that the switching operation has only to be performed by the switch pressing part 26 of either one of the first link member 3 and the second link member 4. In this case, a switching section of the membrane switch sheet 7 is designed in correspondence with the switch pressing part 26 to be used for performing the switching operation.

Furthermore, An area surrounded by the joint portion 19, each plate member 18, and the cantilever member 32 constitutes a spring placing section 34 in which a torsion spring 33 shown in FIG. 4 is placed. This torsion spring 33, as shown in FIG. 4, has a coil portion 33C between a first arm 33A and a second arm 33B to elastically urge the cantilever member 32 leftward in FIG. 7. In the spring placing section 34, a first holding part 36 having a U-shaped wall portion 35 (see FIG. 6) formed on the inner wall surface of one of the plate members 18, a second holding part 38 having three fixing pieces 37 formed in the joint portion 19, facing the cantilever member 32, and a third holding part 40 having two fixing pieces 39 formed on the inner surface of the cantilever member 32, facing each fixing piece 37.

The wall portion 35 of the first holding part 36 movably holds, within its U-shaped groove, the end of the first arm 33A of the torsion spring 33. Each fixing piece 37 of the second holding part 38 fixedly holds the second arm 33B. Each fixing piece 39 of the third holding part 40 fixedly holds the first arm 33A.

With the above structure, as mentioned later, the depression force resulting from the depression of the key top 2 acts on the first cam portion 24A of the first link member 3 and the second cam portion 24B of the second link member 4 which are in contact with each other. At this time, the cantilever member 32 of the first link member 3 is deformed, which causes the first cam portion 24A to move leftward in FIG. 6 against the urging force of the torsion spring 33, and simultaneously the cantilever member 32 of the second link member 4 is deformed, which causes the second cam portion 24B to move rightward in FIG. 6 against the urging force of the torsion spring 33. In this state, in each of the first link member 3 and the second link member 4, the first arm 33A of the torsion spring 33 is fixedly held by each fixing piece 39 of the third holding part 40 and the second arm 33B is fixedly held by each fixing piece 37 of the second holding part 38. The end of the first arm 33A is movable within the U-shaped groove of the wall portion 35 of the first holding part 36 in response to deformation of the cantilever member 32. When the second cam portion 24B is moved rightward in response to the deformation of the cantilever member 32, accordingly, the end of the first arm 33A is moved within the U-shaped groove of the wall portion 35. In this manner, the torsion springs 33 of the first link member 3 and the second link member 4 continuously urge respective cantilever members 32 in a direction to bring the first cam portion 24A and the second cam portion 24B into contact with each other. Thus, the elastic force to bring the first cam portion 24A and the second cam portion 24B into contact with each other may be produced by each torsion spring 33, so that there is no need to produce the elastic force by the cantilever members 32. As a result, the cantilever members 32 can be made of a resinous material at low cost and to be relatively flexible. Consequently, there is little possibility that creep occurs in the cantilever members 32 even when the switching operation is performed for a long term, and the switching operation can be ensured stably over a long term.

Next explanation is made on the operation of the key switch device 1 in the second embodiment, referring to FIGS. 8A to 8C. FIGS. 8A to 8C are explanatory views schematically showing a series of movements of the key top 2 from the non-depressed state to the depressed state for performing a switching operation with a focus on movements of the first link member 3 and the second link member 4.

In FIGS. 8A to 8C, at first, in the non-depressed state where the key top 2 is not depressed, the key top 2 is held in the non-depressed position as shown in FIG. 8A. In this state, the cam surface 25A of the first cam portion 24A of the first link member 3 and the cam surface 25A of the second cam portion 24B of the second link member 4 are in contact relation with each other. In this contact state, the urging forces of the torsion springs 33 placed in the first link member 3 and the second link member 4 act in a direction to bring the cam surfaces 25A into contact with each other. Accordingly, as shown in FIG. 8A, the lower shaft 22 of the first link member 33 is brought into contact with the inner wall surface of the wall portion 10D of the engagement groove 10A of the engagement member 10 and similarly the lower shaft 22 of the second link member 4 is brought into contact with the inner wall surface of the wall portion 10D of the engagement groove 10A of the engagement member 10. The key top 2 is thus stably held in the non-depressed position. In the contact state where the cam surfaces 25A are in contact with each other, the urging force of each torsion spring 33 of the first link member 3 and the second link member 4 acts in a direction to bring the cam surfaces 25A into contact with each other. The key top 2 held in the non-depressed position will not be moved in a horizontal direction, thereby preventing rattles of the key top 2. At this time, the restricting projection 30 formed in each plate member 18 of the first link member 3 and the second link member 4 is in contact with the upper side of the shaft-restricting surface 31A of the wall member 31.

When the depression of the key top 2 is started, the upper shaft 21 of the first link member 3 is rotated clockwise in the engagement recess 8A of the rotation engagement portion 8 and the upper shaft 21 of the second link member 4 is rotated counterclockwise in the engagement recess 9A of the rotation engagement portion 9. Simultaneously, the lower shaft 22 of the first link member 3 is allowed to slide leftward in the engagement groove 10A of the engagement member 10 and the lower shaft 22 of the second link member 4 is allowed to slide rightward in the engagement groove 10A of the engagement member 10. At this time, each restricting projection 30 is guided along and in contact with the curved surface of the shaft-restricting surface 31A of the wall member 31. Accordingly, based on the cooperative operation of the restricting projection 30 and the shaft-restricting surface 31A of the wall member 31, the horizontal movement of the key top 2 can be restrained. Furthermore, the cam surface 25A of the first cam portion 24A of the first link member 3 and the cam surface 25A of the second cam portion 24B of the second link member 4 gradually come away from each other and then the cam apex 27A of the first cam portion 24A and the cam concave portion 27B of the second cam portion 24B come into contact with each other. This state is shown in FIG. 8B.

At this time, the cam apex 27A and the cam concave portion 27B, acting on each other for positioning, will not misalign at all with each other, which completely synchronize the first and second cam portions 24A and 24B.

When further depressed, the key top 2 is put into the state shown in FIG. 8C. The switch pressing part 26 formed in the elastic resinous piece 23 of the first link member 3 presses the upper film sheet of the membrane switch sheet 7. This causes the movable electrode pattern formed on the under surface of the upper film sheet to come into contact with the fixed electrode pattern of the lower film sheet through the switching hole of the film spacer, thereby performing a predetermined switching operation. At this time, each lower shaft 22 of the first link member 3 and the second link member 4 is brought into contact with the wall surface opposite to the wall portion 10D within the engagement groove 10A as shown in FIG. 8C.

Each elastic resinous piece 23 is elastically deformed when the key top 2 is further depressed from the state shown in FIG. 8C. Each elastic resinous piece 23 absorbs the amount of travel of the key top 2, which can achieve the so-called over travel of the key top 2.

When the depression of the key top 2 is cancelled after execution of the switching operation as described above, the interaction between the first cam portion 24A of the first link member 3 and the second cam portion 24B of the second link member 4 and the cooperative operation of the urging force of each torsion spring 33 cause the key top 2 to perform a reverse movement to return to the non-depressed position shown in FIG. 8A.

The behavior of each torsion spring 33 during the above mentioned depressing operation of the key top is explained. At first, in the non-depressed position of the key top 2 shown in FIG. 8A, each torsion spring 33 continuously urges the cantilever member 32 in a direction to bring the first cam portion 24A and the second cam portion 24B into contact with each other. This urging force of the torsion spring 33 causes the cam surfaces 25A of the first cam portion 24A and the second cam portion 24B to come into contact with each other, thereby holding the key top 2 in the non-depressed potion. At this time, the first arm 33A of the torsion spring 33, as shown in FIG. 6, is in contact with an end portion (a closed portion) of the U-shaped groove of the wall portion 35.

When the key top 2 is depressed, the depressing force based on the depression acts on the first cam portion 24A of the first link member 3 and the second cam portion 24B of the second link member 4 which are in contact with each other. At this time, the cantilever member 32 in the first link member is deformed, which moves the first cam portion 24A leftward in FIG. 6 against the urging force of the torsion spring 33, and simultaneously the cantilever member 32 in the second link member 4 is deformed, which moves the cam portion 24B rightward in FIG. 6 against the urging force of the torsion spring 33. In this state, in each of the first link member 3 and the second link member 4, the first arm 33A of the torsion spring 33 is fixedly held by each fixing piece 39 of the third holding part 40 and the second arm 33B is fixedly held by each fixing piece 37 of the second holding part 38. The end of the first arm 33A is moved within the U-shaped groove of the wall portion 35 to the open side thereof in association with the deformation of the cantilever member 32.

When the depression of the key top 2 is canceled, the first arm 33A of the torsion spring 33 is moved by its elastic force from the open side of the wall portion 35 to the end side of the U-shaped groove and finally is engaged in contact with the end of the U-shaped groove.

As explained in detail above, the key switch device 1 according to the second embodiment is constructed such that the cantilever member 32 which supports the first cam portion 24A of the first link member 3 is urged by the torsion spring 33 and the cantilever member 32 which supports the second cam portion 24B of the second link member 4 is urged by the torsion spring 33, respectively, in the direction to bring the first cam portion 24A and the second cam portion 24B into contact with each other. By the contact state of the first cam portion 24A and the second cam portion 24B and the cooperative operation of each torsion spring 33 urging each cantilever member 32, the key top 2 can be urged upward to be held in the non-depressed position and also the key top 2 is allowed to return to the non-depressed position at the time of cancellation of the depression. Accordingly, the key switch device 1 can be constructed without use of a rubber spring and a complicated urging mechanism, which can achieve a cost reduction. Moreover, each torsion spring 33 urges each cantilever member 32 and therefore the first cam portion 24A and the second cam portion 24B are continuously in contact with each other with the contact position varying in response to the vertical movement of the key top 2. By changing the shapes of the first cam portion 24A and the second cam portion 24B as needed, therefore, it is possible to freely design the click touch which occurs during the key operation.

Furthermore, each cantilever member 32 is elastically urged by each torsion spring 33 in the first link member 3 and the second link member 4 so that the first cam portion 24A and the second cam portion 24B supported by each cantilever member 32 are brought into contact with each other. The elastic force to bring the first cam portion 24A and the second cam portion 24B into contact with each other may be produced by each torsion spring 33. Accordingly, each cantilever member 32 is not requested to have the elastic force. Thus, each cantilever member 32 can be made of a resinous material at low cost and to be relatively flexible. Consequently, there is little possibility that creep occurs in the cantilever member 32 even when the switching operation is performed for a long term, and the switching operation can be ensured stably over a long term.

Furthermore, the placing parts 34 for placing the torsion springs 33 are provided in the first link member 3 and the second link member 4, so that the torsion springs 33 can integrally be mounted in the first link member 3 and the second link member 4, thus achieving a size reduction of the whole key switch device 1.

The torsion spring 33 having the first arm 33A and the second arm 33B is used as the urging member for bringing the first cam portion 24A and the second cam portion 24B into contact with each other. The first arm 33A is held by the wall portion 35 of the first holding part 36 in the spring placing section 34 while the second arm 33B is held by the fixing pieces 37 of the second holding part 38. Thus, the first arm 33A and the second arm 33B which provide the urging force to each other in the torsion spring 33 are held. This simple structure makes it possible to efficiently transmit the urging force produced between the arm portions 33A and 33B to the cantilever member 32.

Moreover, the first arm 33A is movably held in the U-shaped groove of the wall portion 35 of the first holding part 36 and the second arm 33B is fixedly held by each fixing piece 37 of the second holding part 38, so that the urging force generated by the torsion spring 33 is transmitted from the first arm 33A being in contact with the cantilever member 32 to the cantilever member 32. At this time, the first arm 33A being movably held in the U-shaped groove of the wall portion 35 of the first holding part 36, during the depressing operation of the key top 2, the first arm 33A is allowed to flexibly move in the first holding part 36 in response to the reactive force resulting from the contact force occurring between the first cam portion 24A and the second cam portion 24B, while constantly holding the first cam portion 24A and the second cam portion 24B in a contact relation.

A brief explanation of the structure of a key switch device in a third embodiment, provided in the keyboard 105 of the notebook-size personal computer 100 mentioned above is provided below with reference to FIGS. 9 to 13. The key switch device in the third embodiment is identical to the key switch device 1 in the first embodiment in that the first link member 3 and the second link member 4 have different structures and the torsion spring 33 is placed in only the second link member 4, whereas the key switch device in the third embodiment differs from the key switch device 1 in the first embodiment in that different structures from those in the first embodiment are adopted for a first cam portion formed in the first link member and a second cam portion formed in the second link member and, correspondingly, two cam synchronizing parts are provided to synchronize the cam surface of the first cam portion and the cam surface of the second cam portion during the depressing operation of a key top. Other elements of the key switch device in the third embodiment are basically identical to those of the key switch device in the first embodiment, and therefore identical elements, members, and others are explained with the same reference numerals and the explanation of the identical structures to those in the first embodiment is omitted.

The detailed structures of a first link member 3 and a second link member 4 constituting a guide member 5 in the key switch device 1 in the third embodiment are described with reference to FIG. 9 and FIG. 10. These first link member 3 and second link member 4 are slightly different in structure. FIG. 10 is plan views and side views of the first link member 3 and the second link member 4.

Figure 9:
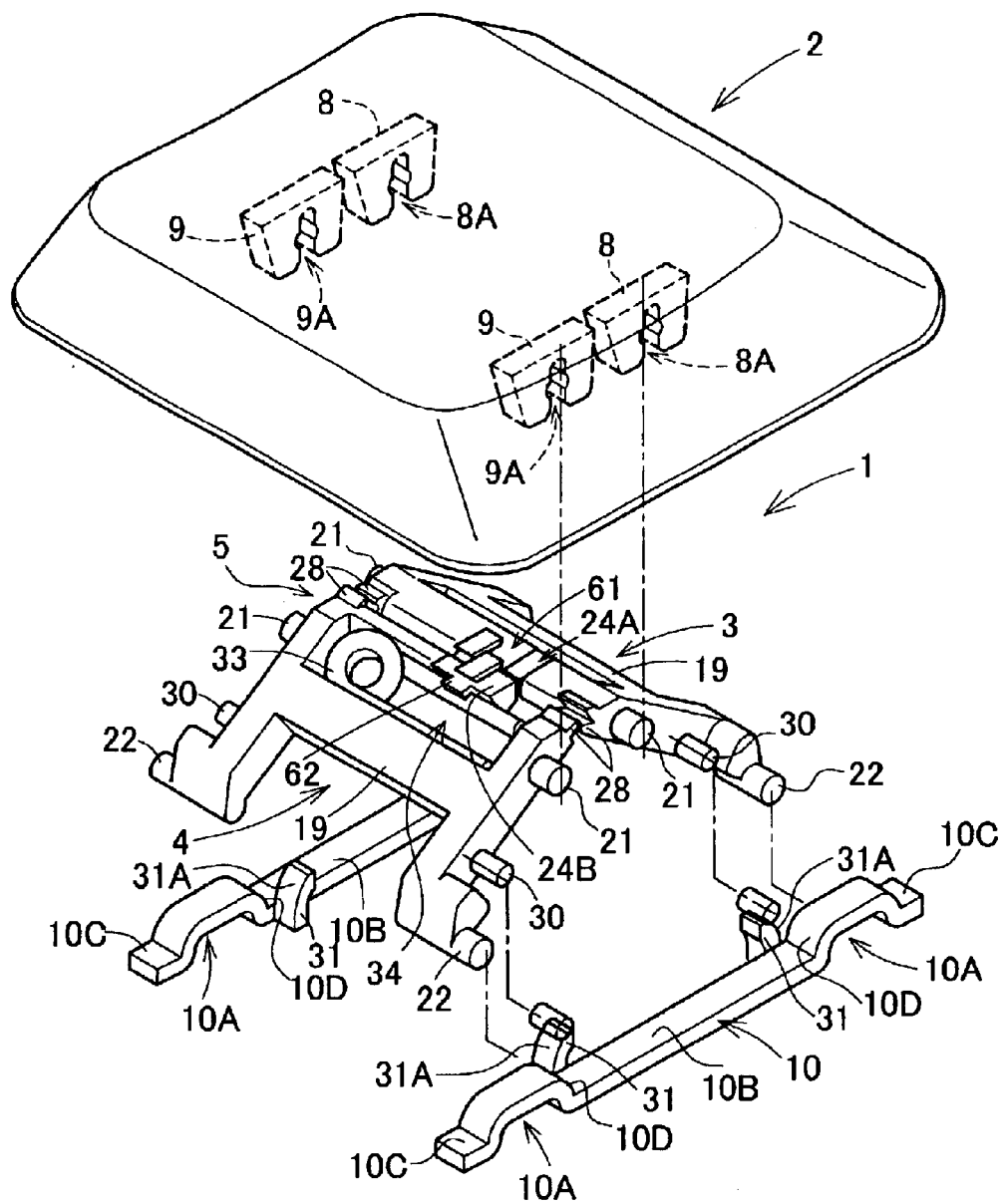
Figure 10:
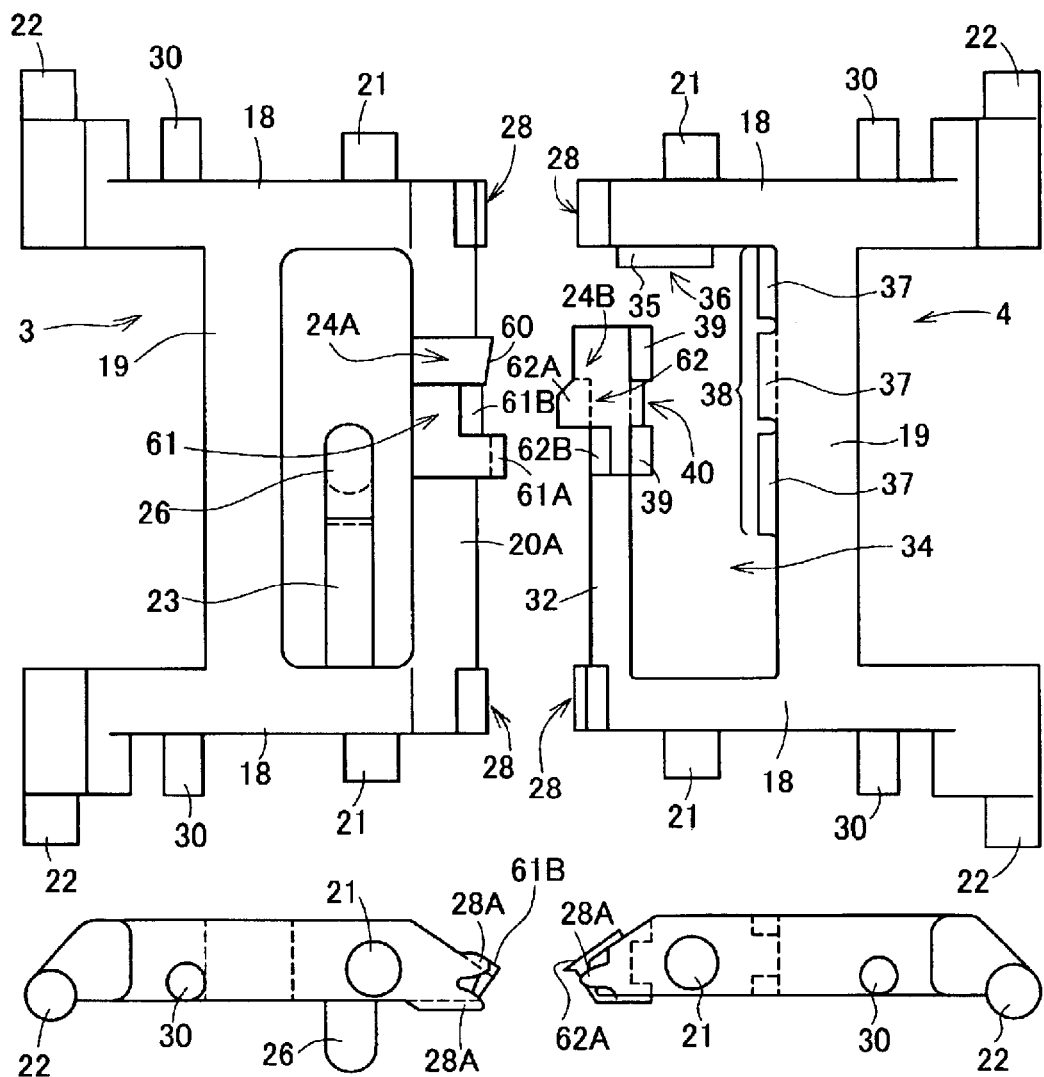

In FIG. 9 and FIG. 10, the first link member 3 is structured of a pair of plate members 18, 18, a joint portion 19 joining the plate members 18, and a joint portion 20A joining outer end portions of the plate members 18, which are integrally made of polyacetal resin, etc. as a unit. An upper shaft 21 is provided extending outward from each plate member 18 at one end side (an upper end in FIG. 9 and a right end in FIG. 10). A lower shaft 22 is provided extending outward from each plate member 18 at the other end side (a lower end in FIG. 9 and a left end in FIG. 10). Each upper shaft 21 is rotatably engaged in the engagement groove 8A of the rotation engagement portion 8 of the key top 2. Each lower shaft 22 is slidably engaged in the engagement groove 10A of the engagement member 10 fixedly adhered on the surface of the upper film sheet of the membrane switch sheet 7.

The joint portion 20A is integrally formed at an outer position slightly deviated from its center position with a first cam portion 24A. The first cam portion 24A is formed with a cam surface 25A formed in an acutely-angled shape including a slanted surface 60 (see FIGS. 11A to 11C). A cam apex 27A exists at the boundary between this cam surface 25A and a continuous surface from the cam surface 25A. This cam surface 25A corresponds to the non-depressed position of the key top 2 as is clear from FIGS. 11A to 11C.

In addition, a cam synchronizing part 61 is formed adjacently to the first cam portion 24A (see the side views of FIG. 10). This cam synchronizing part 61 includes a pressing portion 61A and a concave portion 61B which are integrally formed, and performs a synchronizing operation in cooperation with a cam synchronizing part 62 formed in a cantilever member 32 of the second link member 4.

Each plate member 18 is provided with a gear portion 28 arranged nearer the end side than the upper shaft 21 (a right end side in FIG. 9 and FIG. 10). The gear portion 28 has one gear tooth or two gear teeth 28A. In the side views of FIG. 10, the gear portion 28 of one of the plate members 18 is formed with one gear tooth 28A, while the gear portion 28 of the other plate member 18 is formed with two gear teeth 28A. It is to be noted that the gear teeth 28A of the first link member 3 and the second link member 4 are engaged with each other to function for synchronously operating the first link member 3 and the second link member 4 in association with the vertical movement of the key top 2.

Moreover, one of the plate members 18 (the lower plate member 18 in FIG. 10) is integrally formed with an elastic resinous piece 23 extending from the inner wall to almost the center of a distance between the plate members 18. This elastic resinous piece 23 is provided at its lower end with a switch pressing part 26. The switch pressing part 26 of the elastic resinous piece 23, as mentioned later, elastically presses the movable electrode pattern on the upper switch sheet of the membrane switch sheet 7 from above when the key top is 2 depressed, thereby performing a switching operation with respect to the fixed electrode pattern on the lower film sheet.

A restricting projection 30 is formed extending outward from the side surface of each plate member 18 of the first link member 3. This restricting projection 30 is always in contact with a shaft-restricting surface 31A of a wall member 31 provided in the engagement member 10 as mentioned above.

Successively, the structure of the second link member 4 is described with reference to FIG. 9 and FIG. 10. It is to be noted that the torsion spring is identical to the torsion spring 33 used in the first and second embodiments. Identical members and the like to those of the first link member 3 are explained with the same reference numerals.

In each figure, the second link member 4 is structured of a pair of plate members 18, 18, a joint portion 19 joining the plate members 18, and a cantilever member 32 formed in a cantilever beam shape extending inward from one end of one of the plate members 18 (a left end portion of the lower plate member 18 in FIG. 10), which are integrally made of polyacetal resin, etc. as a unit. An upper shaft 21 is provided extending outward from each plate member 18 at one end side (an upper end in FIG. 9 and a left end in FIG. 10). A lower shaft 22 is provided extending outward from each plate member 18 at the other end side (a lower end in FIG. 9 and a right end in FIG. 10). Each upper shaft 21 is rotatably engaged in an engagement groove 9A of a rotation engagement portion 9 of the key top 2 mentioned above. Each lower shaft 22 is slidably engaged in an engagement groove 10A of an engagement member 10 fixedly adhered on the surface of the upper film sheet of the membrane switch sheet 7.

The cantilever member 32 is integrally formed at its outer end with a second cam portion 24B. As with the first cam portion 24A, the second cam portion 24B is formed at its lower side with a cam surface 25A. A cam apex portion 27A is formed at the boundary between the cam surface 25A and a continuous surface from the cam surface 25A. The cam surface 25A cooperates with the cam surface 25A of the first link member 3 for the non-depressed position of the key top 2, as is clear from FIGS. 11A to 11C. It is to be noted that the cam surface 25A of the second cam portion 24B is provided in parallel to a first arm 33A of the torsion spring 33 mentioned later (see FIG. 12).

The cam surface 25A of the first cam portion 24 is formed in an acutely-angled shape in plan view including the slanted surface 60 as mentioned above. In the non-depressed state of the key top 2, the cam surface 25A of the second cam portion 24B and the first cam portion 24A are in contact with each other at linear contact portions along an edge line of an acutely-angled projection of the cam surface 25A of the first cam portion 24A (see FIG. 11A and FIG. 12), not in planar contact. It is to be noted that, as the key top 2 becomes depressed, as mentioned later, the cam apexes 27 of the first cam portion 24A and the second cam portion 24B come into contact with each other at point-shaped contact portions (see FIG. 11B and FIG. 11C). These contact portions become a point of action S (see FIG. 12) on which the urging force of the torsion spring 33 acts.

Figure 12:
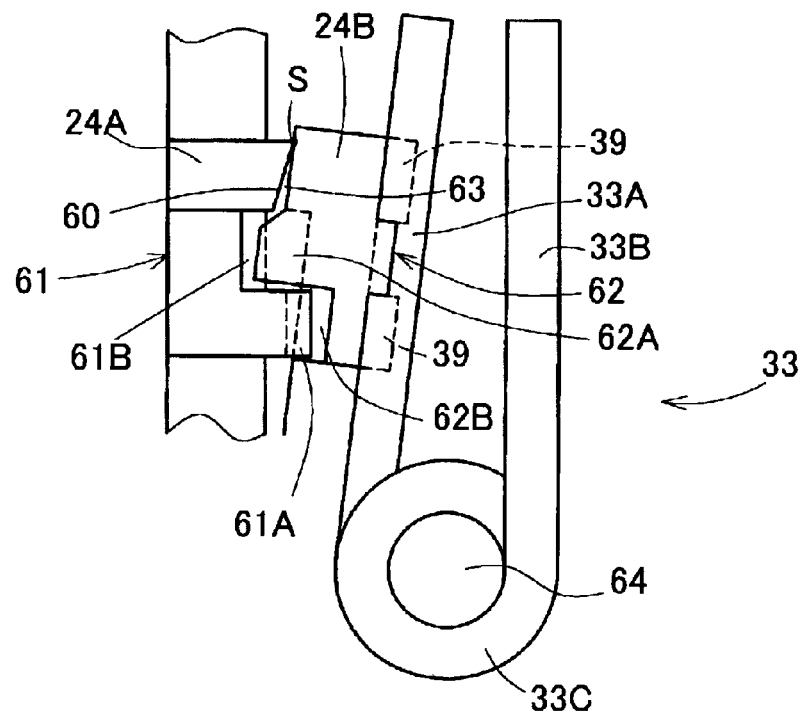

In the above structure, a clearance 63 is provided between the cam surface 25A of the second cam portion 24B and the slanted surface 60 of the first cam portion 24A as shown in FIG. 12. This clearance 63 is open toward a fixed point 64 of the torsion spring 33 (a center point of the coil portion 33C) mentioned later.

The cam synchronizing part 62 is formed adjacently to the second cam portion 24B (see the side views of FIG. 10). This cam synchronizing part 62 includes a pressing portion 62A and a concave portion 62B which are integrally formed, and performs a synchronizing operation in cooperation with a cam synchronizing part 61 formed in the first link member 3. To be more specific, the pressing portion 61A of the cam synchronizing part 61 of the first link member 3 is placed in the concave portion 62B of the cam synchronizing part 62 of the second link member 4 and the pressing portion 62A of the cam synchronizing part 62 is placed in the concave portion 61B of the cam synchronizing part 61. Although the cam surface 25A of the first cam portion 24A and the cam surface 25A of the second cam portion 24B are in contact with each other at the linear contact portions in the non-depressed state of the key top 2, the cam apexes 27 of the first cam portion 24A and the second cam portion 24B come into contact with each other at the point-shaped contact portions as the key top 2 is depressed. This may cause the cam apexes 27 to become vertically misaligned with each other, which interferes with the operation of the key top 2. Accordingly, the synchronizing parts 61, 62 constructed as above serve to provide synchronization to prevent the cam apexes 27 from becoming vertically misaligned with each other during the depressing operation of the key top 2.

Each plate member 18 is provided with a gear portion 28 arranged nearer the end side than the upper shaft 21 (a right end side in FIG. 9 and FIG. 10). The gear portion 28 has one gear tooth or two gear teeth 28A. In the side views of FIG. 10, the gear portion 28 of one of the plate members 18 is formed with one gear tooth 28A, while the gear portion 28 of the other plate member 18 is formed with two gear teeth 28A.

Additionally, a restricting projection 30 is formed extending outward from the side surface of each plate member 18 of the first link member 3. This restricting projection 30 is always in contact with a shaft-restricting surface 31A of a wall member 31 provided in the engagement member 10 as mentioned above.

An area surrounded by the joint portion 19, each plate member 18, and the cantilever member 32 constitutes a spring placing section 34 in which the torsion spring 33 is placed. The torsion spring 33 has a coil portion 33C between a first arm 33A and a second arm 33B to elastically urge the cantilever member 32 leftward in FIG. 10. In the spring placing section 34, a first holding part 36 having a U-shaped wall portion 35 formed on the inner wall surface of one of the plate members 18, a second holding part 38 having three fixing pieces 37 formed in the joint portion 19, facing the cantilever member 32, and a third holding part 40 having two fixing pieces 39 formed on the inner surface of the cantilever member 32, facing each fixing piece 37.

The wall portion 35 of the first holding part 36 movably holds, within its U-shaped groove, the end of the first arm 33A of the torsion spring 33. Each fixing piece 37 of the second holding part 38 fixedly holds the second arm 33B. Each fixing piece 39 of the third holding part 40 fixedly holds the first arm 33A.

With the above structure, as mentioned later, the depressing force resulting from the depression of the key top 2 acts on the first cam portion 24A of the first link member 3 and the second cam portion 24B of the second link member 4 which are in contact with each other. At this time, the joint part 20A of the first link member 3 is not elastically deformed, holding the first cam portion 24A in the same position, whereas the cantilever member 32 is deformed, which causes the second cam portion 24B to move rightward in FIG. 10 against the urging force of the torsion spring 33. In this state, the first arm 33A of the torsion spring 33 is fixedly held by each fixing piece 39 of the third holding part 40, and, the second arm 33B is fixedly held by each fixing piece 37 of the second holding part 38. The end of the first arm 33A is movable within the U-shaped groove of the wall portion 35 of the first holding part 36 in response to deformation of the cantilever member 32. When the second cam portion 24B is moved rightward in response to the deformation of the cantilever member 32, accordingly, the end of the first arm 33A is moved within the U-shaped groove of the wall portion 35. In this manner, the torsion spring 33 continuously urges the cantilever member 32 in a direction to bring the first cam portion 24A and the second cam portion 24B into contact with each other. Thus, the elastic force to bring the first cam portion 24A and the second cam portion 24B into contact with each other is produced based on the elastic force of the cantilever member 32 and the elastic force of the torsion spring 33. It is to be noted that the torsion spring 33 urges, as mentioned above, the second cam portion 24B toward the first cam portion 24A during the depressing operation of the key top 2 and, during this time, the coil portion 33C of the torsion spring 33 is not moved. Accordingly, the center point of the coil portion 33C is assumed to be the fixed point 64 for convenience.

Figure 11A:
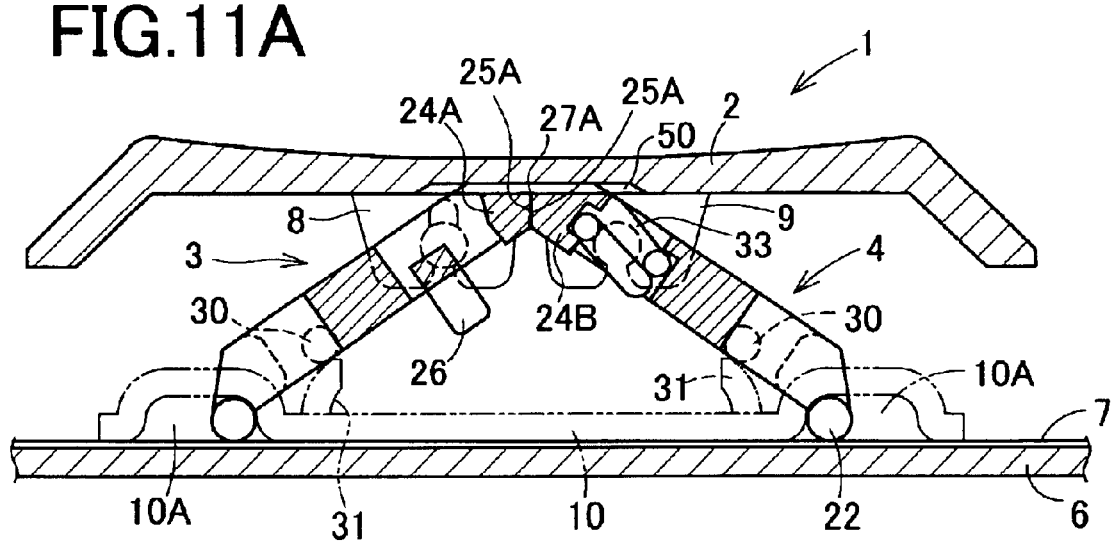
FIG. 11A to FIG. 11C are explanatory views schematically showing a series of movements of a key top in a non-depressed state to a depressed state for performing a switching operation with a focus on movements of the first and second link members.
Figure 11B:
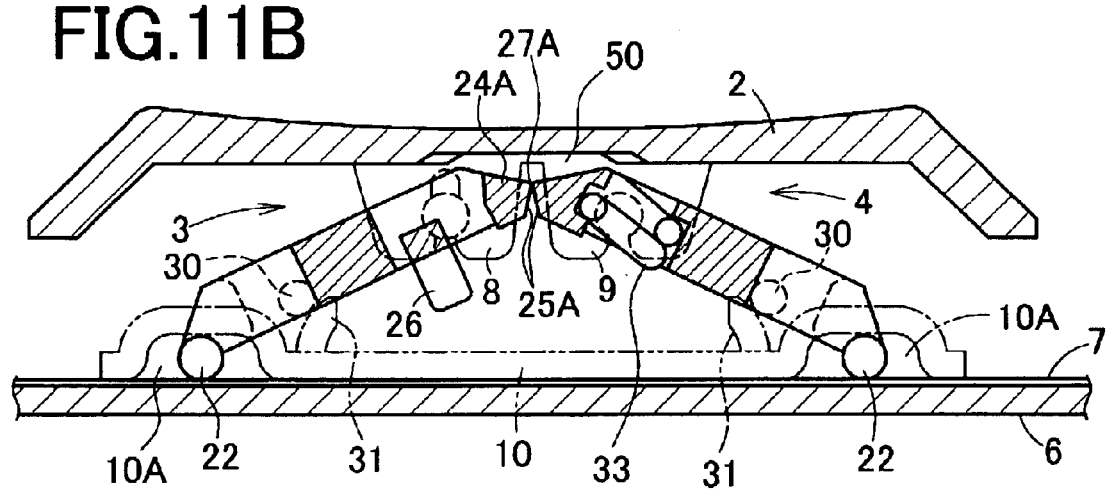
Figure 11C:
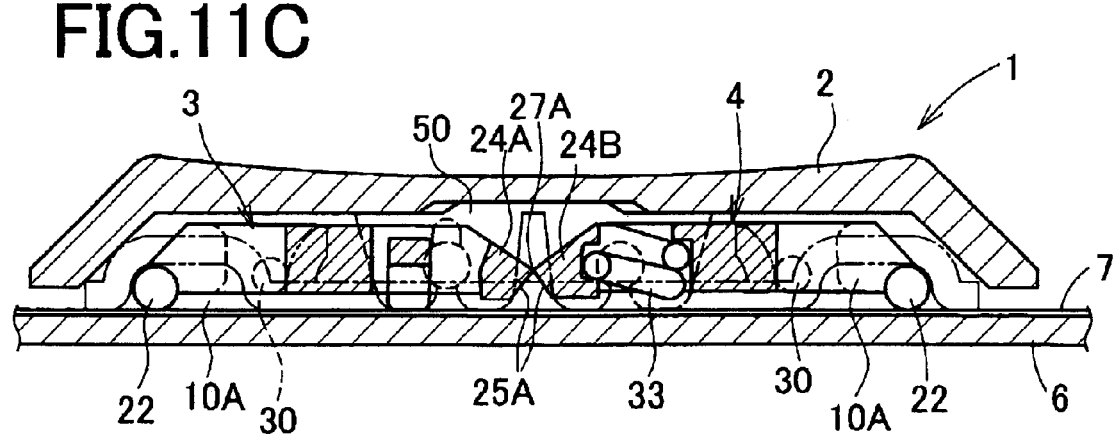

Next explanation is made on the operation of the key switch device 1 in the third embodiment, referring to FIGS. 11A to 11C and FIG. 12. FIGS. 11A to 11C are explanatory views schematically showing a series of movements of the key top 2 from the non-depressed state to the depressed state for performing a switching operation with a focus on movements of the first link member 3 and the second link member 4. FIG. 12 is an explanatory view schematically showing a contact state of the first cam portion 24A and the second cam portion 24B in plan and enlarged view.

In FIGS. 11A to 11C, at first, in the non-depressed state where the key top 2 is not depressed, the key top 2 is held in the non-depressed position as shown in FIG. 11A. In this state, the cam surface 25A of the first cam portion 24A of the first link member 3 and the cam surface 25A of the second cam portion 24B of the second link member 4 are in contact relation with each other. In this contact state, the urging force of the torsion spring 33 acts in a direction to bring the cam surfaces 25A into contact with each other. Accordingly, as shown in FIG. 5A, the lower shaft 22 of the first link member 33 is brought into contact with the inner wall surface of the wall portion 10D of the engagement groove 10A of the engagement member 10 and similarly the lower shaft 22 of the second link member 4 is brought into contact with the inner wall surface of the wall portion 10D of the engagement groove 10A of the engagement member 10. Thus, the key top 2 is stably held in the non-depressed position. In the contact state where the cam surfaces 25A are in contact with each other, the urging force of the torsion spring 33 acts in a direction to bring the cam surfaces 25A into contact with each other. The key top 2 held in the non-depressed position will not be moved in a horizontal direction, thereby preventing rattles of the key top 2. At this time, the restricting projection 30 formed in each plate member 18 of the first link member 3 and the second link member 4 is in contact with the upper side of the shaft-restricting surface 31A of the wall member 31.

In plan view, as shown in FIG. 12, in the non-depressed state of the key top 2, the cam surface 25A of the first cam portion 24A formed in an acutely-angled shape in plan view including the slanted surface 60 and the cam surface 25A of the second cam portion 24B provided in parallel to the first arm 33A of the torsion spring 33 are in contact with each other at the linear contact portions (the point of action S) along the edge line of the acutely-angled projection of the cam surface 25A of the first cam portion 24A.

When the depression of the key top 2 is started, the upper shaft 21 of the first link member 3 is rotated clockwise in the engagement recess 8A of the rotation engagement portion 8 and the upper shaft 21 of the second link member 4 is rotated counterclockwise in the engagement recess 9A of the rotation engagement portion 9, in association of the depression of the key top 2. Simultaneously, the lower shaft 22 of the first link member 3 is allowed to slide leftward in the engagement groove 10A of the engagement member 10 and the lower shaft 22 of the second link member 4 is allowed to slide rightward in the engagement groove 10A of the engagement member 10. At this time, each restricting projection 30 is guided along and in contact with the curved surface of the shaft-restricting surface 31A of the wall member 31. Accordingly, based on the cooperative operation of the restricting projection 30 and the shaft-restricting surface 31A of the wall member 31, the horizontal movement of the key top 2 can be restrained. Furthermore, the contact conformation between the cam surface 25A of the first cam portion 24A of the first link member 3 and the cam surface 25A of the second cam portion 24B of the second link member 4 becomes the contact conformation that the cam apexes 27 come into contact with each other at the point-shaped contact portions (the point of action S). This state is shown in FIG. 5B.

At this time, the cam synchronizing parts 61 and 62 provide synchronization to prevent the cam apexes 27 from becoming vertically misaligned with each other during the depressing operation of the key top 2. Accordingly, the cam apexes 27A will not vertically misalign at all with each other, which can completely synchronize the first and second cam portions 24A and 24B.

When further depressed, the key top 2 is put into the state shown in FIG. 11C. The switch pressing part 26 formed in the elastic resinous piece 23 of the first link member 3 presses the upper film sheet of the membrane switch sheet 7. This causes the movable electrode pattern formed on the under surface of the upper film sheet to come into contact with the fixed electrode pattern of the lower film sheet through the switching hole of the film spacer, thereby performing a predetermined switching operation. At this time, each lower shaft 22 of the first link member 3 and the second link member 4 is brought into contact with the wall surface opposite to the wall portion 10D within the engagement groove 10A as shown in FIG. 11

The elastic resinous piece 23 is elastically deformed when the key top 2 is further depressed from the state shown in FIG. 11 The elastic resinous piece 23 absorbs the amount of travel of the key top 2, which can achieve the so-called over travel of the key top 2.

When the depression of the key top 2 is cancelled after execution of the switching operation as described above, the interaction between the first cam portion 24A of the first link member 3 and the second cam portion 24B of the second link member 4 and the cooperative operation of the urging force of the torsion spring 33 cause the key top 2 to perform a reverse movement to return to the non-depressed position shown in FIG. 11A.

The behavior of the torsion spring 33 during the above mentioned depressing operation of the key top is explained. At first, in the non-depressed position of the key top 2 shown in FIG. 115A, the torsion spring 33 continuously urges the cantilever member 32 in a direction to bring the first cam portion 24A and the second cam portion 24B into contact with each other. This urging force of the torsion spring 33 brings the cam surfaces 25A of the first cam portion 24A and the second cam portion 24B into contact with each other, thereby holding the key top 2 in the non-depressed potion. At this time, the first arm 33A of the torsion spring 33 is in contact with an end portion (a closed portion) of the U-shaped groove of the wall portion 35.

When the key top 2 is depressed, the depressing force based on the depression acts on the first cam portion 24A of the first link member 3 and the second cam portion 24B of the second link member 4 which are in contact with each other. At this time, the extended portion 20A of the first link member 3 is not elastically deformed, thus holding the first cam portion 24A in the same position, whereas the cantilever member 32 is deformed, thus moving the second cam portion 24B rightward in FIG. 10 against the urging force of the torsion spring. In this state, the first arm 33A of the torsion spring 33 is fixedly held by each fixing piece 39 of the third holding part 40 and the second arm 33B is fixedly held by each fixing piece 37 of the second holding part 38. The end of the first arm 33A is moved within the U-shaped groove of the wall portion 35 to the open side thereof in association with the deformation of the cantilever member 32.

When the depression of the key top 2 is cancelled, the first arm 33A of the torsion spring 33 is moved by its elastic force from the open side of the wall portion 35 to the end side of the U-shaped groove and finally is engaged in contact with the end of the U-shaped groove.

The cam surface 25A of the first cam portion 24A and the cam surface 25A of the second cam portion 24B are brought into contact with each other at the linear contact portions in the non-depressed state of the key top 2 and, as the key top 2 becomes depressed, the cam apexes 27A of the first cam portion 24A and the second cam portion 24B are brought into contact at the point-shaped contact portions. In the case where the depressing operation of the key top 2 is repeated many times, the first cam portion 24A formed in an acutely-angled shape would wear. This wear of the first cam portion 24A weakens the force to press the first arm 33A of the torsion spring 33 in correspondence with the amount of wear. The initial urging force of the torsion spring 33 which is exerted on the cantilever member 32 as the reaction force is reduced. Moreover, when the depressing operation of the key top 2 is repeatedly performed, the creep occurs in the cantilever member 32, which lowers the elastic force thereof.

Figure 13:
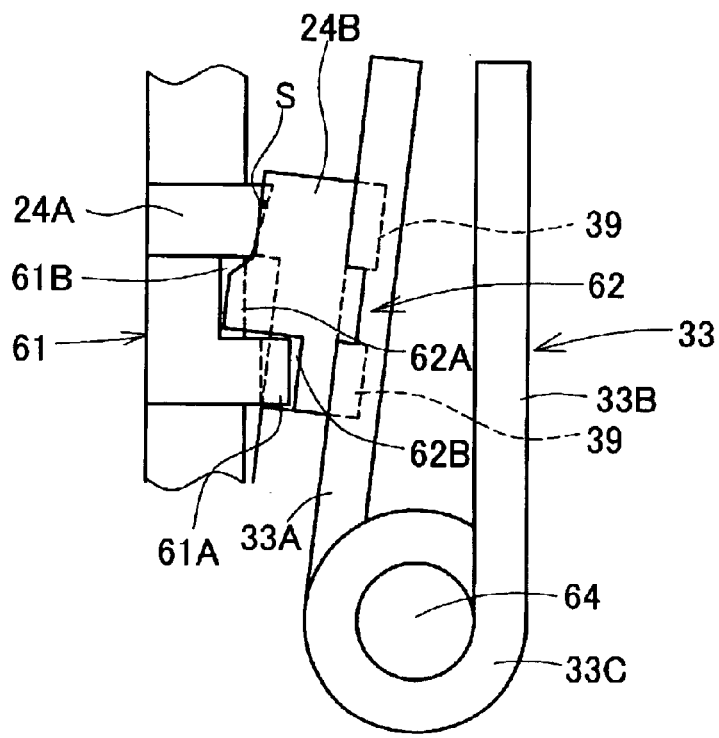

To solve the above problems, in the key switch device 1 in the third embodiment, the second cam portion 24B is formed with the cam surface 25A and the first cam portion 24A is formed with the cam surface 25A which comes into contact at an acute angle in plan view with the cam surface 25A of the second cam portion 24B at the linear and point-shaped contact portions and has the slanted surface 60. Between the cam surface 25A of the second cam portion 24B and the slanted surface 60, the clearance 63 is provided to be open from the contact portions toward the fixed point 64 side of the torsion spring 33. Accordingly, if the cam surface 25A of the first cam portion 24A formed in an acutely-angled shape wears due to the repeated depressing operation of the key top 2, the cam surface 25A will wear in a direction which the clearance 63 existing between the cam surface 25A of the second cam portion 24B and the slanted surface 60 is gradually closed from the contact portions toward the fixed point 64. As a result of this, the point of action S of the urging force of the torsion spring 33, as shown in FIG. 13, comes close to the fixed point 64 of the torsion spring 33, causing the urging force of the torsion spring 33 which is exerted on the cantilever member 32 to increase. Thus, even when the initial urging force of the torsion spring 33 is reduced due to the wear of the cam surface 25A of the first cam portion 24A, the reduction in initial urging force is cancelled out by an increment of the increased urging force when the point of action S of the urging force in the contact portions of the cam surfaces 25A of the first cam portion 24A and the second cam portion 24B comes close to the fixed point 64 side of the torsion spring 33. Consequently, even if the switching operation is repeatedly performed for a long term, the depression characteristic of the key top 2 can be surely prevented from being largely changed and can be stabilized. The switching operation can be ensured stably over a long term.

In the case where the elastic force of the cantilever member 32 is reduced due to the repeated depressing operation of the key top 2, as mentioned above, the point of action S of the torsion spring 33 in the contact portions of the first cam portion 24A and the second cam portion 24B comes close to the fixed point 64 side of the torsion spring 33, which increases the urging force of the torsion spring 33 which is exerted on the cantilever member 32. Accordingly, the increased urging force can compensate the reduction in elastic force of the cantilever member 32. This also make it possible to stabilize the depression characteristic of the key top 2.

As explained in detail above, the key switch device 1 according to the third embodiment is constructed such that the second cam portion 24B of the second link member 4 is supported by the cantilever member 32 extended like a cantilever beam from the second link member 4 and the cantilever member 32 is urged by the torsion spring 33 in the direction to bring the first cam portion 24A of the first link member 3 and the second cam portion 24B into contact with each other. By the contact state of the first cam portion 24A of the first link member 3 and the second cam portion 24B of the second link member 4 and the cooperative operation of the torsion spring 33 urging the cantilever member 32, the key top 2 can be urged upward to be held in the non-depressed position and also the key top 2 is allowed to return to the non-depressed position at the time of cancellation of the depression. Accordingly, the key switch device 1 can be constructed without use of a rubber spring and a complicated urging mechanism, which can achieve a cost reduction. Moreover, the torsion spring 33 urges the cantilever member 32 and therefore the first cam portion 24A and the second cam portion 24B are continuously in contact with each other with the contact position varying in response to the vertical movement of the key top 2. By changing the shapes of the first cam portion 24A and the second cam portion 24B as needed, therefore, it is possible to freely design the click touch which occurs during the key operation.

Furthermore, the placing part 34 for placing the torsion spring 33 is provided in the second link member 4, so that the torsion spring 33 can integrally be mounted in the second link member 4, thus achieving a size reduction of the whole key switch device 1.

The torsion spring 33 having the first arm 33A and the second arm 33B is used as the urging member for bringing the first cam portion 24A and the second cam portion 24B into contact with each other and the first arm 33A is held by the wall portion 35 of the first holding part 36 in the spring placing section 34 while the second arm 33B is held by the fixing pieces 37 of the second holding part 38. Thus, the first arm 33A and the second arm 33B which provide the urging force to each other in the torsion spring 33 are held. This simple structure makes it possible to efficiently transmit the urging force produced between the arm portions 33A and 33B to the cantilever member 32.

Moreover, the first arm 33A is movably held in the U-shaped groove of the wall portion 35 of the first holding part 36 and the second arm 33B is fixedly held by each fixing piece 37 of the second holding part 38, so that the urging force generated by the torsion spring 33 is transmitted from the first arm 33A being in contact with the cantilever member 32 to the cantilever member 32. At this time, the first arm 33A being movably held in the U-shaped groove of the wall portion 35 of the first holding part 36, during the depressing operation of the key top 2, the first arm 33A is allowed to flexibly move in the first holding part 36 in response to the reactive force resulting from the contact force occurring between the first cam portion 24A and the second cam portion 24B, while constantly holding the first cam portion 24A and the second cam portion 24B in a contact relation.

In addition, there are provided the restricting projection 30 formed extending from the side surface of each plate member 18 of the first link member 3 and the second link member 4 and the wall member 31 having the shaft-restricting curved surface 31A integrally formed with the engagement member 10 near the inner side end of each engagement groove 10A, so that the horizontal movement of the key top can be restrained based on the cooperative operation between the restricting projection 30 and the shaft-restricting surface 31A of the wall member 31. There is no need to provide a guide wall, a positioning member, and the like of a relatively larger height to restrain the horizontal movement of the key top 2 in the course of depression. Consequently, a cost reduction can be achieved by the simple structure.

The second cam portion 24B is formed with the cam surface 25A and the first cam portion 24A is formed with the cam surface 25A which comes into contact at an acute angle in plan view with the cam surface 25A of the second cam portion 24B at the linear and point-shaped contact portions and has the slanted surface 60. Between the second cam portion 24B and the slanted surface 60, the clearance 63 is provided to be open from the contact portions toward the fixed point 64 side of the torsion spring 33. Accordingly, if the cam surface 25A of the first cam portion 24A formed in an acutely-angled shape wears when the depressing operation of the key top 2 is repeatedly performed, the cam surface 25A will wear with the clearance 63 gradually closing from the contact portions to the fixed point 64 side of the torsion spring 33. As a consequence, the point of action S of the urging force of the torsion spring 33, as shown in FIG. 13, comes close to the fixed point 64 side of the torsion spring 33, so that the urging force of the torsion spring which is exerted on the cantilever member increases. Thus, even when the initial urging force of the torsion spring 33 is reduced due to the wear of the cam surface 25A of the first cam portion 24A, the reduction in initial urging force is cancelled out by an increment of the increased urging force when the point of action S of the urging force in the contact portions of the cam surfaces 25A of the first cam portion 24A and the second cam portion 24B comes close to the fixed point 64 side of the torsion spring. Consequently, even if the switching operation is repeatedly performed for a long term, the depression characteristic of the key top 2 can be surely prevented from being largely changed and can be stabilized. The switching operation can be ensured stably over a long term.

In the case where the elastic force of the cantilever member 32 is reduced due to the repeated depressing operation of the key top 2, as mentioned above, the point of action S of the torsion spring 33 in the contact portions of the first cam portion 24A and the second cam portion 24B comes close to the fixed point 64 side of the torsion spring 33, which increases the urging force of the torsion spring 33 which is exerted on the cantilever member 32. Accordingly, the increased urging force can compensate the reduction in elastic force of the cantilever member 32. This also make it possible to stabilize the depression characteristic of the key top 2.

It is to be noted that the present invention is not limited to the first through third embodiments and may be embodied in other specific forms without departing from the essential characteristics thereof. For instance, in the first and second embodiments, the present invention is applied to a notebook-size personal computer. It needs scarcely be said that the present invention may be applied to an electronic device provided with a key switch device such as a typewriter, a word processor, etc.

In each preferred embodiment, for the restriction of the horizontal movement of the key top 2 in the course of depression, the movement restricting mechanism is provided between the engagement member 10 and each link member 3, 4; however, the movement restricting mechanism may be provided between the key top 2 and each link member 3, 4.

Additionally, in each preferred embodiment, the movement restricting mechanism of the present invention is realized in the key switch device 1 in which the upper shafts of the first link member 3 and the second link member 4 are rotatably engaged on the underside of the key top 2 and the lower shafts 22 are movably engaged in the engagement grooves 10A of the engagement members 10. It may naturally be realized in a key switch device having the reverse engagement relations to those engagement relations.

The present invention can similarly be realized about a guide member 5 in which a first link member 3 and a second link member 4 are pivotally supported in an X-shape.

INDUSTRIAL APPLICABILITY

As explained above, according to the present invention, a rubber spring generally used in a conventional key switch device and a complicated key top urging mechanism are not needed and a key operation can be performed with a fine click touch during operation of a key top. The click touch can be freely designed. Accordingly, there can be provided the key switch device capable of maintaining a constant depression characteristic of the key top over a long term and achieving a cost reduction of the whole key switch device, the keyboard provided with the key switch device and the electronic device provided with the keyboard.

What is claimed is:

1. A key switch device including a key top and a pair of a first and a second link members movably disposed under the key top, for performing switching of a switching section while guiding a vertical movement of the key top by the first and second link members, the key switch device comprising:
   a first cam portion formed in the first link member;
   a second cam portion formed in the second link member and disposed facing the first cam portion;
   a cantilever member formed in a cantilever beam shape extending from the first link member or the second link member to support at least one of the first cam portion and the second cam portion; and
   an urging member for elastically urging the cantilever member in which one of the cam portions is formed in a direction to bring the first cam portion and the second cam portion into contact with each other.

2. The key switch device described in claim 1, wherein the first or second link member formed with the cantilever member is provided with a placing part for placing the urging member.

3. The key switch device described in claim 2, wherein the urging member is constructed of a torsion spring including a first arm which comes into contact with the cantilever member and a second arm facing the first arm, the placing part includes a first holding part for holding the first arm and a second holding part for holding the second arm.

4. The key switch device described in claim 3, wherein the first holding part movably holds the first arm and the second holding part fixedly holds the second arm.

5. A keyboard, comprising:

at least two or more key switch devices according to claim 1.

6. A key switch device including a key top and a pair of a first and a second link members movably disposed under the key top, for performing switching of a switching section while guiding a vertical movement of the key top by the first and second link members, the key switch device comprising:

a first cam portion formed in the first link member;

a second cam portion formed in the second link member and disposed facing the first cam portion;

a first cantilever member formed in a cantilever beam shape extending from the first link member to support the first cam portion;

a second cantilever member formed in a cantilever beam shape extending from the second link member to support the second cam portion;

a first urging member for elastically urging the first cantilever member in a direction to bring the first cam portion and the second cam portion into contact with each other; and a second urging member for elastically urging the second cantilever member in a direction to bring the first cam portion and the second cam portion into contact with each other.

7. The key switch device described in claim 6, wherein the first link member is provided with a placing part for placing the first urging member, and the second link member is provided with a placing part for placing the second urging member.

8. The key switch device described in claim 7, wherein the first urging member is constructed of a first torsion spring including a first arm which comes into contact with the first cantilever member and a second arm facing the first arm, the placing part of the first link member includes a first holding part for holding the first arm of the first torsion spring and a second holding part for holding the second arm of the first torsion spring, the second urging member is constructed of a second torsion spring including a first arm which comes into contact with the second cantilever member and a second arm facing the first arm, and the placing part of the second link member includes a first holding part for holding the first arm of the second torsion spring and a second holding part for holding the second arm of the second torsion spring.

9. The key switch device described in claim 8, wherein the first holding part of the placing part in the first link member movably holds the first arm of the first torsion spring and the second holding part of the placing part in the first link member fixedly holds the second arm of the first torsion spring, and the second holding part of the placing part in the second link member movably holds the first arm of the second torsion spring and the second holding part of the placing part in the second link member fixedly holds the second arm of the second torsion spring.

10. A keyboard, comprising:

at least two or more key switch devices according to claim 6.

11. A key switch device including a key top and a pair of a first and a second link members movably disposed under the key top, for performing switching of a switching section while guiding a vertical movement of the key top by the first and second link members, the key switch device comprising:

a first cam portion formed in the first link member;

a second cam portion formed in the second link member and disposed facing the first cam portion;

a cantilever member formed in a cantilever beam shape extending from the first link member or the second link member to support at least one of the first cam portion and the second cam portion; and an urging member for elastically urging the cantilever member in which one of the cam portions is formed in a direction to bring the first cam portion and the second cam portion into contact with each other, wherein the first cam portion and the second cam portion are brought into contact with each other at contact portions, the first cam portion and the second cam portion each have a shape to cause the point of action of the urging force of the urging member acting on the contact portions to shift to a predetermined fixed point side of the urging member in association with a repeated switching operation.

12. The key switch device described in claim 11, wherein the first or second link member formed with the cantilever member is provided with a placing part for placing the urging member.

13. The key switch device described in claim 12, wherein the urging member is constructed of a torsion spring including a first arm which comes into contact with the cantilever member and a second arm facing the first arm, the placing part includes a first holding part for holding the first arm and a second holding part for holding the second arm.

14. The key switch device described in claim 13, wherein the first holding part movably holds the first arm and the second holding part fixedly holds the second arm.

15. The key switch device described in claim 14, wherein one of the cam portions supported by the cantilever member is formed with a first cam surface parallel to the first arm, the other cam portion of the first cam portion and the second cam portion is formed with a second cam surface which is brought into contact with the first cam surface in the contact portions at an acute angle in plan view and has a slanted surface, and a clearance is provided between the first cam surface and the slanted surface to open from the contact portions toward the fixed point side of the urging member.

16. A keyboard, comprising:

at least two or more key switch devices according to claim 11.

17. An electronic device, comprising:

a keyboard for inputting letters, symbols, and others, provided with a key switch device including a key top and a pair of a first and a second link members movably disposed under the key top, for performing switching of a switching section while guiding a vertical movement of the key top by the first and second link members, the key switch including:

a first cam portion formed in the first link member;
a second cam portion formed in the second link member and disposed facing the first cam portion;
a cantilever member formed in a cantilever beam shape extending from the first link member or the second link member to support at least one of the first cam portion and the second cam portion; and
an urging member for elastically urging the cantilever member in which one of the cam portions is formed in a direction to bring the first cam portion and the second cam portion into contact with each other;
display means for displaying the letters, symbols, and others; and
control means for causing the display means to display the letter, symbols, and others based on the input data from the keyboard.

18. An electronic device, comprising:
a keyboard for inputting letters, symbols, and others, provided with a key switch device including a key top and a pair of a first and a second link members movably disposed under the key top, for performing switching of a switching section while guiding a vertical movement of the key top by the first and second link members,
the key switch including:
  a first cam portion formed in the first link member;
  a second cam portion formed in the second link member and disposed facing the first cam portion;
  a first cantilever member formed in a cantilever beam shape extending from the first link member to support the first cam portion;
  a second cantilever member formed in a cantilever beam shape extending from the second link member to support the second cam portion;
  a first urging member for elastically urging the first cantilever member in a direction to bring the first cam portion and the second cam portion into contact with each other; and
  a second urging member for elastically urging the second cantilever member in a direction to bring the first cam portion and the second cam portion into contact with each other;
display means for displaying the letters, symbols, and others; and
control means for causing the display means to display the letter, symbols, and others based on the input data from the keyboard.

19. An electronic device, comprising:
a keyboard for inputting letters, symbols, and others, provided with a key switch device including a key top and a pair of a first and a second link members movably disposed under the key top, for performing switching of a switching section while guiding a vertical movement of the key top by the first and second link members,
the key switch including:
  a first cam portion formed in the first link member;
  a second cam portion formed in the second link member and disposed facing the first cam portion;
  a cantilever member formed in a cantilever beam shape extending from the first link member or the second link member to support at least one of the first cam portion and the second cam portion; and
  an urging member for elastically urging the cantilever member in which one of the cam portions is formed in a direction to bring the first cam portion and the second cam portion into contact with each other,
wherein the first cam portion and the second cam portion are brought into contact with each other at contact portions, the first cam portion and the second cam portion each have a shape to cause the point of action of the urging force of the urging member acting on the contact portions to shift to a predetermined fixed point side of the urging member in association with a repeated switching operation;
display means for displaying the letters, symbols, and others; and
control means for causing the display means to display the letter, symbols, and others based on the input data from the keyboard.

* * * * *